United States Patent
Hano et al.

(10) Patent No.: US 8,087,754 B2
(45) Date of Patent: Jan. 3, 2012

(54) ELECTROSTATIC ACTUATOR, DROPLET DISCHARGE HEAD, METHOD FOR DRIVING DROPLET DISCHARGE HEAD, AND METHOD FOR MANUFACTURING ELECTROSTATIC ACTUATOR

(75) Inventors: Yoshifumi Hano, Chino (JP); Masahiro Fujii, Shiojiri (JP)

(73) Assignee: Seiko Epson Corporation (JP)

( * ) Notice: Subject to any disclaimer, the term of this patent is extended or adjusted under 35 U.S.C. 154(b) by 208 days.

(21) Appl. No.: 12/537,501

(22) Filed: Aug. 7, 2009

(65) Prior Publication Data

US 2009/0295877 A1 Dec. 3, 2009

Related U.S. Application Data

(63) Continuation of application No. 11/497,034, filed on Jul. 31, 2006, now Pat. No. 7,661,794.

(30) Foreign Application Priority Data

| Aug. 1, 2005 | (JP) | 2005-223216 |
| Aug. 1, 2005 | (JP) | 2005-223217 |
| Aug. 1, 2005 | (JP) | 2005-223218 |
| Jun. 9, 2006 | (JP) | 2006-161130 |

(51) Int. Cl.
*B41J 2/045* (2006.01)
*B41J 2/055* (2006.01)

(52) U.S. Cl. ........................................................ 347/54
(58) Field of Classification Search .................. 347/54, 347/68–71
See application file for complete search history.

(56) References Cited

U.S. PATENT DOCUMENTS

| 5,652,609 | A | 7/1997 | Scholler et al. |
| 2003/0194102 | A1 | 10/2003 | Yamasaki et al. |

FOREIGN PATENT DOCUMENTS

| JP | 04-344250 | 11/1992 |
| JP | 2000-165999 | * 6/2000 |
| JP | 2000-280490 | 10/2000 |
| JP | 2002-248756 | 9/2002 |
| JP | 2003-282360 | 10/2003 |
| JP | 2004-120809 | 4/2004 |
| JP | 2004-255605 | 9/2004 |
| JP | 2004-255614 | 9/2004 |
| JP | 2005-138385 | 6/2005 |
| JP | 2005-144594 | 6/2005 |
| JP | 2005-161706 | 6/2005 |
| JP | 2005-191208 | 7/2005 |

* cited by examiner

*Primary Examiner* — Huan Tran
(74) *Attorney, Agent, or Firm* — Harness, Dickey & Pierce, P.L.C.

(57) ABSTRACT

To provide an electrostatic actuator capable of attaining a large diaphragm displacement by low voltage drive. Furthermore, a droplet discharge head provided with this electrostatic actuator, a method for driving a droplet discharge head, and a method for manufacturing an electrostatic actuator are provided. A diaphragm 4, an individual electrode 11 facing the diaphragm 4 with a gap 10 therebetween, while a voltage is applied between the diaphragm 4 and the individual electrode 11, and an insulating film 4a which is disposed on a surface of the diaphragm 4, the surface facing the individual electrode 11, are included, wherein the insulating film 4a is converted to an electret.

8 Claims, 16 Drawing Sheets

4a: INSULATING FILM
10: GAP

1: CAVITY PLATE
2: ELECTRODE SUBSTRATE
3: NOZZLE PLATE
4: DIAPHRAGM
5: DISCHARGE CHAMBER
6: RESERVOIR
7: ELECTRODE TERMINAL
10a: ELECTRODE CONCAVE PORTION
11: INDIVIDUAL ELECTRODE
12: LEAD PORTION
13: TERMINAL PORTION
17: LIQUID SUPPLY HOLE
20: NOZZLE
21: ORIFICE
21a: CONCAVE PORTION
22: RESERVOIR DIAPHRAGM
22a: CONCAVE PORTION
100: DROPLET DISCHARGE HEAD

4a: INSULATING FILM
10: GAP

4b: INSULATING FILM
100a: DROPLET DISCHARGE HEAD

4c: INSULATING FILM
4d: ELECTRET PORTION
100b: DROPLET DISCHARGE HEAD (a)          (b)

(a)

(b)

(a)

STANDBY STATE (b)

- ELECTRIC CHARGE
- DIAPHRAGM DETACHMENT
- DROPLET DISCHARG (c)

- ELECTRIC DISCHARGE
- DIAPHRAGM CONTACT
- MENISCUS RETURN

FIG. 20
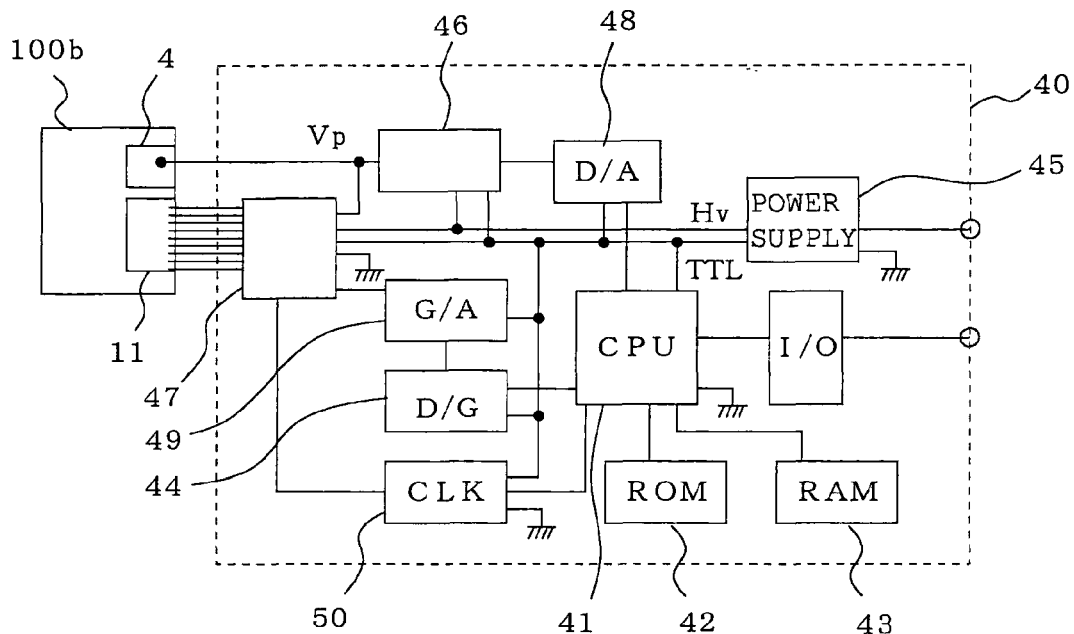
FIG. 21
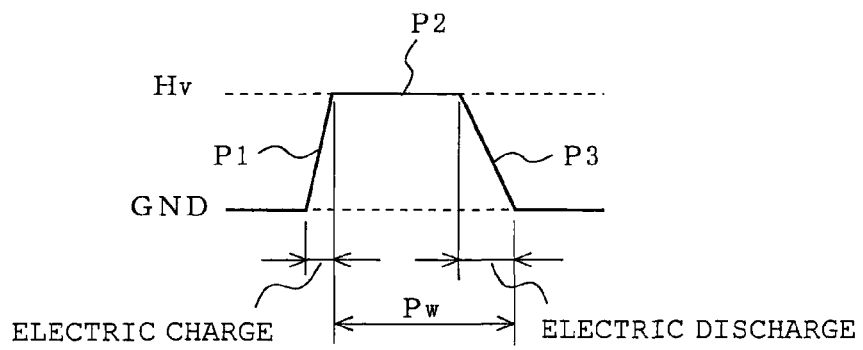
FIG. 22
| | COMMON ELECTRODE | INDIVIDUAL ELECTRODE |
|---|---|---|
| DRIVE | Vp | GND |
| NON-DRIVE | Vp | Vp |
| STANDBY | GND | GND |

(a)

HEATING
~150°C (b)

TEMPERATURE KEEPING
150°C
VOLTAGE APPLICATION
50V KEEPING
10 min TO 20 min (c)

SLOW COOLING
~25°C
VOLTAGE APPLICATION
50V KEEPING
VOLTAGE RELIEF

110: INK-JET RECORDING APPARATUS

LIGHT INCIDENT DIRECTION

US 8,087,754 B2

ELECTROSTATIC ACTUATOR, DROPLET DISCHARGE HEAD, METHOD FOR DRIVING DROPLET DISCHARGE HEAD, AND METHOD FOR MANUFACTURING ELECTROSTATIC ACTUATOR

This application is a continuation of U.S. patent application Ser. No. 11/497,034 filed on Jul. 31, 2006. This application claims the benefit of Japanese Patent Application No. Japanese Patent Application No. 2005-223216, filed Aug. 1, 2005, No. 2005-223217, filed Aug. 1, 2005, No. 2005-223218, filed Aug. 1, 2005 and No. 2006-161130, filed Jun. 9, 2006. The disclosures of the above applications are incorporated herein by reference.

BACKGROUND OF THE INVENTION

1. Field of the Invention

The present invention relates to an electrostatic actuator to be used as a driving mechanism of an ink-jet head and the like, a droplet discharge head, a method for driving a droplet discharge head, and a method for manufacturing an electrostatic actuator.

2. Description of the Related Art

Examples of droplet discharge head previously include a thermal type droplet discharge head by using a heat generating element or the like as a driving device and an actuator drive type droplet discharge head. Examples of actuator drive types include a so-called electrostatic drive type, in which an electrostatic force is used as a driving device, and a so-called piezoelectric drive type, in which a piezoelectric element (piezo element) is used.

In the actuator drive type droplet discharge head, a diaphragm constituting a part of a discharge chamber is elastically displaced on the basis of an electrostatic force or a piezoelectric effect of a piezoelectric element, a pressure is generated in a pressure chamber and, thereby, droplets are discharged from a nozzle. For this type of droplet discharge head, in recent years, a multi-nozzle has been used in order to address the high-speed printing. Furthermore, a miniaturized actuator has been required to meet the demands on higher resolution. However, as the actuator is miniaturized and is made denser, the displacement of the diaphragm becomes inadequate. Consequently, there is a problem in that an adequate pressure is not generated in the pressure chamber and a required amount of discharge of droplets cannot be attained.

For piezoelectric drive type droplet discharge apparatuses, a multilayered inorganic electret layer is disposed on a diaphragm to attain a large mechanical driving force and, thereby, the displacement of the diaphragm is increased (for example, Patent Document 1), or a diaphragm is allowed to have a configuration in which an inorganic electret layer and a thin film metal heating pattern are laminated, the electret layer is deformed by application of a voltage and, in addition, the electret layer is expanded by the thin film metal heating pattern, so that the diaphragm is displaced by a large degree (for example, Patent Document 2).

With respect to the electret layer, in addition to the above described technology for applying the electret layer to the droplet discharge head, there is a configuration in which at least one pair of opposed electrodes are disposed on an ink flow path side wall, and one of the pair of electrodes includes the electret layer (for example, Patent Document 3).

[Patent Document 1] Japanese Unexamined Patent Application Publication No. 2004-255605
[Patent Document 2] Japanese Unexamined Patent Application Publication No. 2004-255614
[Patent Document 3] Japanese Unexamined Patent Application Publication No. 2000-280490

In the technology of Patent Document 1, the multilayered inorganic electret layer is disposed on a diaphragm, and the thickness of the diaphragm must be increased to support it. In the technology of Patent Document 2, the diaphragm itself is composed of a multilayer and, likewise, the thickness of the diaphragm is increased. The above-described configurations have problems in that the mechanical resistance is increased, it is difficult to actually attain a diaphragm displacement adequate for stably discharging droplets, and the driving voltage must be increased to attain an adequate diaphragm displacement. Furthermore, there is a problem in that the manufacturing method is complicated and it is difficult to manufacture.

Patent Document 3 discloses the technology in which the electret layer is used for the droplet discharge head in order to improve the ink bubble discharging property. However, there is no specific discussion on the reduction of driving voltage.

SUMMARY

The present invention has been made in consideration of the above-described points. Accordingly, it is an object of the present invention to provide an electrostatic actuator capable of attaining a large diaphragm displacement by low voltage drive. Furthermore, it is an object to provide a droplet discharge head provided with the electrostatic actuator, a method for driving a droplet discharge head, and a method for manufacturing an electrostatic actuator.

An electrostatic actuator according to an aspect of the present invention is provided with a diaphragm; an electrode facing the diaphragm with a gap therebetween, while a voltage is applied between the diaphragm and the electrode; and an insulating film disposed on a surface of the diaphragm, the surface facing the electrode, or on a surface of the electrode, the surface facing the diaphragm, wherein the insulating film is converted to an electret.

Since the insulating film is converted to an electret and is electrified in advance, a large diaphragm displacement can be ensured by low voltage drive. As a result, an electrostatic actuator can be made denser and be miniaturized.

An electrostatic actuator according to an aspect of the present invention is provided with a diaphragm; an electrode facing the diaphragm with a gap therebetween, while a voltage is applied between the diaphragm and the electrode; and an insulating film disposed on a surface of the diaphragm, the surface facing the electrode, or on a surface of the electrode, the surface facing the diaphragm, wherein the insulating film is converted to an electret, and the diaphragm and the electrode are detachably in contact with each other with the insulating film therebetween by an attraction force generated by an electric field based on the electret.

Considering that this electrostatic actuator takes a predetermined action when the diaphragm is operated in such a way as to be detached from the state of being in contact with an individual electrode, since the diaphragm is in the state of being in contact with the electrode in advance by the attraction force based on the electret, the diaphragm can be operated in such a way as to be detached from the electrode by the restoring force of the diaphragm itself simply by application of a voltage adequate for eliminating the attraction force generated by an electric field based on the electret. Therefore, the low voltage drive becomes possible. Put another way, a necessary and adequately large diaphragm displacement can be attained by the low voltage drive. As a result, an electrostatic actuator can be made denser and be miniaturized.

In the electrostatic actuator according to an aspect of the present invention, the diaphragm is detached from the electrode when a voltage is applied between the diaphragm and the electrode in such a way as to cancel the electric field based on the electret.

The diaphragm can be detached from the electrode by the application of such a voltage and, thereby, the low voltage drive becomes possible.

In the electrostatic actuator according to an aspect of the present invention, the gap disposed between the diaphragm and the electrode is sealed and the insulating film converted to the electret is disposed in the sealed space.

Consequently, it can be prevented that water or the like enters the sealed space including the insulating film and adheres to the surface of the insulating film and the amount of electric charge is reduced thereby.

In the electrostatic actuator according to an aspect of the present invention, the diaphragm is composed of a boron-doped silicon substrate.

Consequently, the resistance of the diaphragm can be reduced as compared with that in the case where the diaphragm is formed from silicon substrate not doped with boron, and an effect is exerted on the low voltage drive.

In the electrostatic actuator according to an aspect of the present invention, the insulating film is a silicon oxide film converted to the electret.

A silicon oxide film can be used as the insulating film to be converted to the electret, as described above.

A droplet discharge head according to an aspect of the present invention is provided with a nozzle, a diaphragm constituting a bottom of a discharge chamber which is communicated with the nozzle and which stores droplets to be discharged, and an electrode facing the diaphragm with a gap therebetween, while a voltage is applied between the diaphragm and the electrode, and the nozzle is allowed to discharge a droplet in the discharge chamber by deformation of the diaphragm based on the electrostatic force generated by application of the voltage, wherein an insulating film converted to an electret is disposed on a surface of the diaphragm, the surface facing the electrode, or on a surface of the electrode, the surface facing the diaphragm.

Since the insulating film is converted to an electret and is electrified in advance, a large diaphragm displacement can be attained by low voltage drive. Therefore, a droplet discharge head capable of being made denser and being miniaturized can be attained.

A method for driving a droplet discharge head according to an aspect of the present invention is a method for driving a droplet discharge head provided with a nozzle, a diaphragm constituting a bottom of a discharge chamber which is communicated with the nozzle and which stores droplets to be discharged, an electrode facing the diaphragm with a gap therebetween, while a voltage is applied between the diaphragm and the electrode, and an insulating film which is disposed on a surface of the diaphragm, the surface facing the electrode, or on a surface of the electrode, the surface facing the diaphragm, and which has been converted to an electret, the diaphragm and the electrode being detachably in contact with each other with the insulating film therebetween by an attraction force generated by an electric field based on the electret, and the method includes the step of applying a pulsed voltage between the diaphragm and the electrode in such a way as to cancel the electric field based on the electret.

Consequently, the droplet discharge head can be driven.

In the method for driving a droplet discharge head according to an aspect of the present invention, the pulse width of the pulsed voltage is adjusted in such a way as to allow the timing of falling of the pulsed voltage to agree with the time when the diaphragm detached from the electrode reaches a point closest to the electrode by the vibration of the diaphragm itself.

Consequently, the droplet discharge head can be efficiently driven at a low voltage and droplets can be discharged stably.

A method for manufacturing an electrostatic actuator according to an aspect of the present invention is a method for manufacturing an electrostatic actuator including a diaphragm and an electrode facing the diaphragm with a gap therebetween, while a voltage is applied between the diaphragm and the electrode and the diaphragm is deformed on the basis of electrostatic force generated by application of the voltage, the method including a step of forming an insulating film on a surface of the diaphragm, the surface facing the electrode, or on a surface of the electrode, the surface facing the diaphragm; and an electret step of converting the insulating film to an electret.

An electrostatic actuator having the above-described effects can be produced by this method.

In the method for manufacturing an electrostatic actuator according to an aspect of the present invention, the insulating film is converted to the electret by corona discharge.

The corona discharge can be used as an electrification method for facilitating the conversion to the electret.

In the method for manufacturing an electrostatic actuator according to an aspect of the present invention, the above-described electret step is to convert the insulating film to the electret by subjecting a joint substrate, in which a cavity plate provided with the diaphragm and an electrode substrate provided with the electrode are joined, to a predetermined treatment, wherein the predetermined treatment includes a heating step of heating and keeping the joint substrate; a voltage application step of applying a voltage between the diaphragm and the electrode while the joint substrate is heated and kept, and keeping the state; and a slow cooling step of slow-cooling the joint substrate to room temperature while the voltage is applied.

In this manufacturing method, the insulating film is converted to the electret simply by the steps of heating and voltage application and, therefore, the production is conducted easily.

BRIEF DESCRIPTION OF THE DRAWINGS

FIG. 20 is a diagram showing the specific configuration of a driving control device of a droplet discharge head.

FIG. 21 is a diagram showing a waveform of a driving voltage pulse Vp.

FIG. 22 is a diagram showing a driving logic.

DESCRIPTION OF THE PREFERRED EMBODIMENTS

First Embodiment

Figure 1:
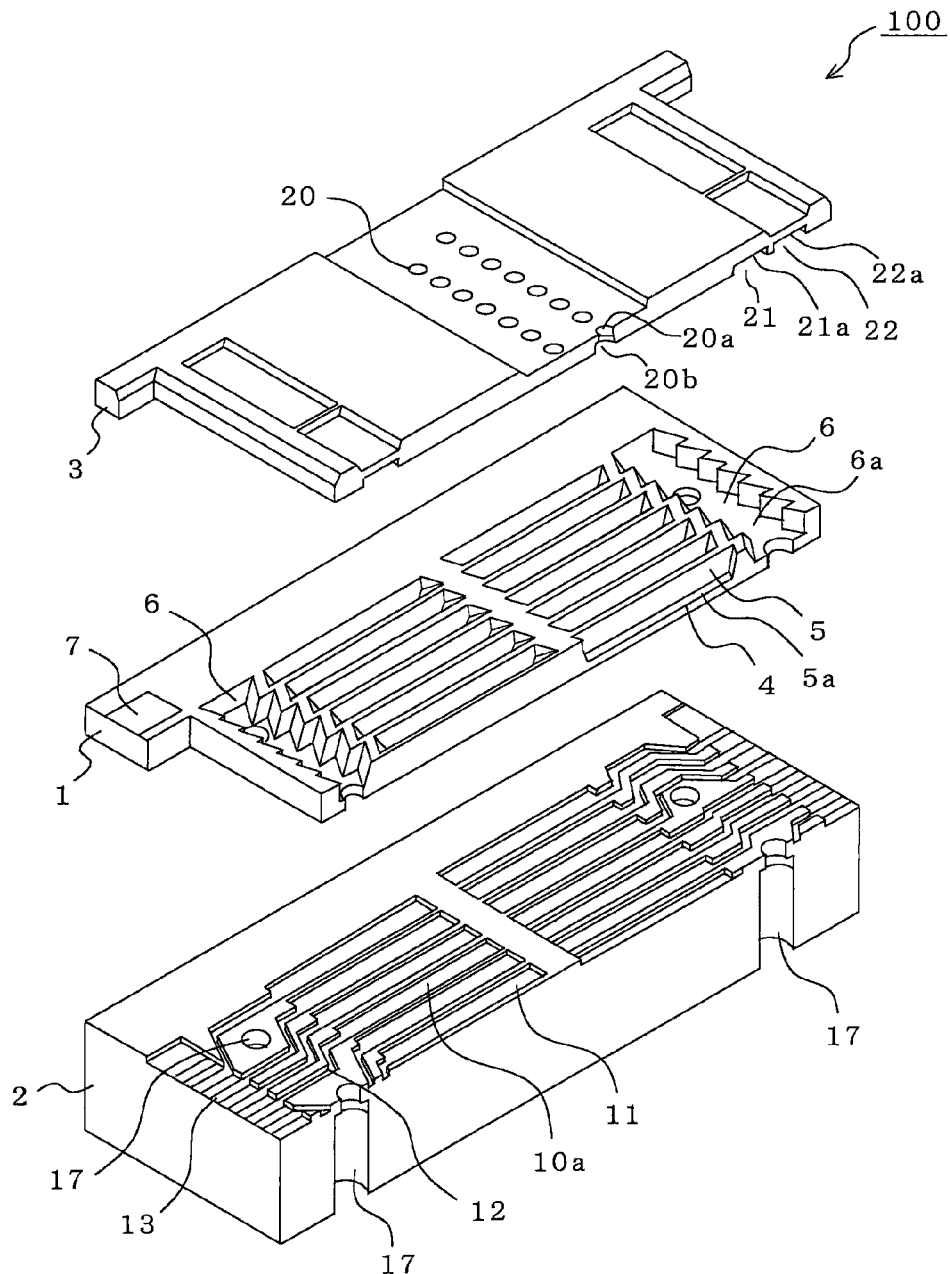
FIG. 1 is a perspective exploded view of a droplet discharge head provided with the electrostatic actuator of the first embodiment.
Figure 2:
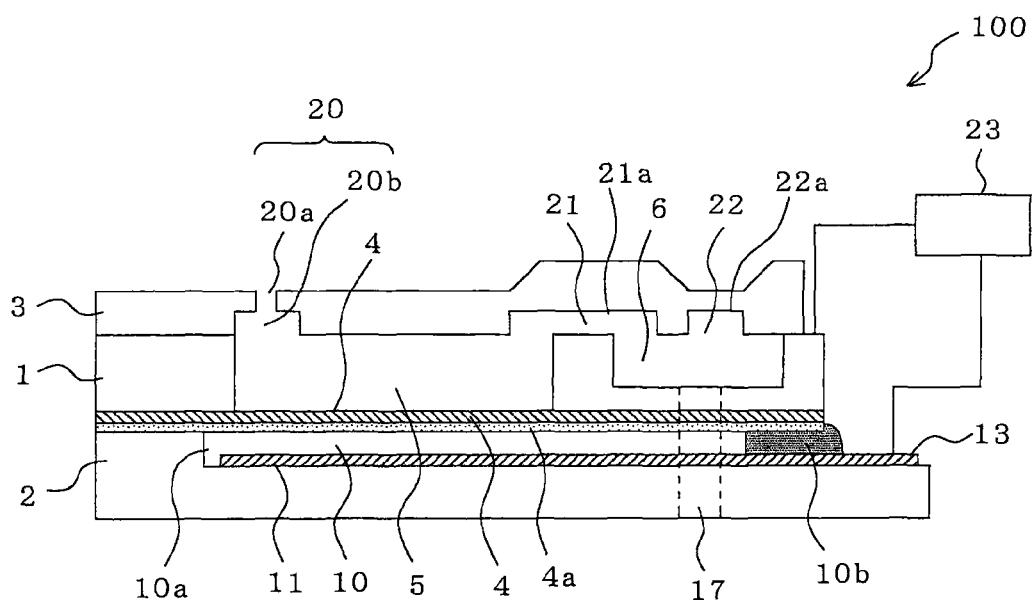
FIG. 2 is a schematic vertical sectional view of the droplet discharge head shown in FIG. 1.

FIG. 1 is a perspective exploded view of a droplet discharge head provided with an electrostatic actuator according to the first embodiment of the present invention. FIG. 2 is a vertical sectional view of the droplet discharge head shown in FIG. 1.

A droplet discharge head 100 of the first embodiment is primarily configured by joining a cavity plate 1, an electrode substrate 2, and a nozzle plate 3. The cavity plate 1 is composed of, for example, a single crystal silicon substrate (hereafter simply referred to as a silicon substrate), and has been subjected to a predetermined processing described below. In FIG. 1, a silicon substrate exhibiting (110) surface orientation is used as the cavity plate 1. The cavity plate 1 is provided with a concave portion 5a serving as a droplet discharge chamber 5, in which the bottom wall is disposed as a diaphragm 4, and a concave portion 6a constituting a reservoir 6 to store droplets to be supplied to each discharge chamber 5 by subjecting the silicon substrate to anisotropic wet etching. The electrode terminal 7 is connected to a driving circuit 23 shown in FIG. 2.

The diaphragm 4 is formed from a high concentration boron-doped layer. This boron-doped layer is formed by doping of boron at a high concentration (about $5 \times 10^{19}$ atoms/cm$^3$ or more), and serves as a so-called etching stop layer exhibiting an extremely slow etching rate when, for example, a single crystal silicon is etched with an alkaline aqueous solution. Since the boron-doped layer functions as the etching stop layer, the thickness of the diaphragm 4 and the volume of the discharge chamber 5 can be formed with high precision. In the present embodiment, the diaphragm 4 having a thickness of 4 μm is formed. The diaphragm 4 having such a configuration functions as a common electrode on the side of individual discharge chambers 5.

An insulating film 4a is disposed all over the surface on the electrode substrate 2 side of the cavity substrate 1. This insulating film 4a is previously disposed to prevent the short circuit and electrical breakdown between the diaphragm 4 functioning as the common electrode on the side of individual discharge chambers 5 and individual electrodes 11 described below. Furthermore, in the present first embodiment, the insulating film 4a has been converted to an electret (a dielectric exhibiting permanent electric polarization), and carries a predetermined amount of electric charge in a state in which no voltage is applied. In the present embodiment, the insulating film 4a having a thickness of 0.1 μm is formed from a silicon oxide film ($SiO_2$ film) and carries electric charge at an amount corresponding to 24 V. The conversion of the insulating film 4a to the electret is described below. The insulating film is disposed all over the outer surface of the cavity plate 1 in reality, but in FIG. 2, a portion, which has been converted to the electret, of the insulating film 4a is simply shown, and the other portion of the insulating film is not shown in the drawing.

The electrode substrate 2 is composed of, for example, borosilicate glass having a thickness of 1 mm, and is joined to the diaphragm 4 side of the cavity plate 1. An electrode concave portion 10a having a depth of, for example, 0.2 μm constituting a gap 10 from the diaphragm 4 is disposed on the electrode substrate 2 by etching. In the inside of this electrode concave portion 10a, an individual electrode 11 is disposed facing the diaphragm 4. The individual electrode 11 is formed from tin oxide-doped ITO (Indium Tin Oxide) or the like, and is disposed by sputtering to have a thickness of 0.1 μm, for example. A liquid supply holes 17 to supply droplets to the reservoir 6 are disposed in the electrode substrate 2. Furthermore, the individual electrode 11 is connected to the driving circuit 23 through a lead portion and a terminal portion 13 (refer to FIG. 1). The gap 10 is sealed with a seal component 10b. The electrode substrate 2 may be formed from a silicon substrate or the like in place of the borosilicate glass.

The nozzle plate 3 is composed of, for example, a single crystal silicon substrate having a thickness of 180 μm, and nozzles 20 penetrating the nozzle plate 3 in a thickness direction are disposed. The nozzles 20 on the lower surface side of the nozzle plate 3 are communicated with the discharge chamber 5, and the nozzles 20 on the upper surface side of the nozzle plate 3 serve as openings for discharging droplets. This nozzle 20 is a stepwise two-stage nozzle, wherein the upper surface side of the nozzle plate 3 is composed of a first channel 20a having a small cross-sectional area and the lower surface side of the nozzle plate 3 is composed of a second channel 20b having a large cross-sectional area. A concave portion 21a serving as an orifice 21 for allowing the discharge chamber 5 to communicate with the reservoir 6 and a concave portion 22a for disposing a reservoir diaphragm 22 are disposed on the lower surface of the nozzle plate 3. A portion, which corresponds to the reservoir diaphragm 22, on the upper surface of the nozzle plate 3 is a concave portion. Since the thickness of the reservoir diaphragm portion 22 is reduced as described above, the pressure interference among the nozzles 20 through the reservoir 6 is prevented, and droplets can be stably discharged regardless of the number of nozzles driven.

A silicon oxide film is disposed all over the outer surface of the nozzle plate 3 in reality, but the silicon oxide film is not shown in FIG. 1 and FIG. 2. FIG. 1 shows an ink-jet head in which the nozzles 20 and the discharge chambers 5 are arranged in two rows. However, the nozzles 20 and the discharge chambers 5 may be aligned in a row. In the example explained with reference to FIG. 1 and FIG. 2, the discharge system is of face eject type in which droplets are discharged parallel to the nozzle plate 3. However, the discharge system may be of side eject type.

The operation of the droplet discharge head shown in FIG. 1 and FIG. 2 will be described below.

When a pulsed voltage is applied between the cavity plate 1 and the individual electrode 11 by the driving circuit 23, an electrostatic force is generated between the diaphragm 4 and the individual electrode 11, and the diaphragm 4 is attracted and bent toward the individual electrode 11 side by the attraction effect thereof, so that the volume of the discharge chamber 5 is increased. Consequently, droplets of ink or the like stored in the inside of the reservoir 6 is flown into the discharge chamber 5 through the orifice 21. Subsequently, when the application of the voltage to the individual electrode 11 is stopped, the electrostatic attraction force is eliminated, the diaphragm 4 is restored, and the volume of the discharge chamber 5 is decreased sharply. Consequently, the pressure in the discharge chamber 5 is increased sharply, and droplets of the ink or the like are discharged from the nozzle 20 communicating with this discharge chamber 5.

Figure 3:
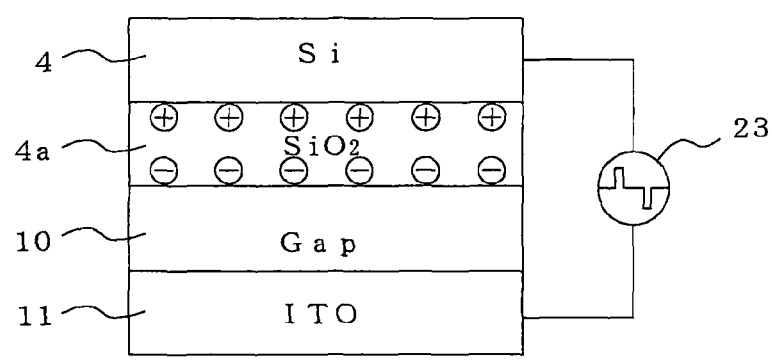
FIG. 3 is a schematic diagram of the configuration of the electrostatic actuator of the first embodiment.

Here, in the droplet discharge head 100, as shown in FIG. 3, the insulating film 4a is converted to an electret, and is in a state of being permanently polarized into a positive pole and a negative pole and being electrified. FIG. 3 is a schematic diagram showing a magnified electrostatic actuator portion, that is, portions of the diaphragm 4, the insulating film 4a, the individual electrode 11, and the driving circuit 23, of the droplet discharge head 100 shown in FIG. 2. Since the insulating film 4a has been converted to the electret and carries a predetermined amount of electric charge as described above, the driving voltage actually applied for attaining the electrostatic force required to operate this diaphragm can be reduced by a voltage corresponding to the amount of electric charge of the insulating film 4a. That is, the diaphragm 4 can be driven by applying a voltage determined by subtracting the voltage corresponding to the amount of electric charge from the driving voltage required to drive the diaphragm 4 when the insulating film 4a is not converted to the electret and, therefore, low voltage drive becomes possible. Put another way, a necessary and adequately large diaphragm displacement can be attained by the low voltage drive. As a result, the droplet discharge head 100 can be miniaturized and the discharge chamber 5 can be made denser.

In the present embodiment, the driving voltage required to perform a discharge operation when the insulating film 4a is not converted to the electret is 30 V, and the insulating film 4a is allowed to carry electric charge at an amount corresponding to 24 V. Therefore, the voltage to be actually applied is 6 V. The amount of electric charge of the insulating film 4a is specified to be an equivalent to 24 V in the present embodiment. However, the amount may be appropriately determined in accordance with the design of the actuator and the like. For example, the amount of electric charge is set within the range, in which the diaphragm 4 is not bent, from the viewpoint of ease of driving control. That is, the amount of electric charge is set in such a way that an electrostatic force smaller than the elastic force of the diaphragm 4 is generated. Furthermore, in order to reduce the driving voltage, it is preferable to increase the amount of electric charge. However, if the amount is too large, when the cavity plate 1 and the electrode substrate 2 are subjected to anode coupling in the manufacturing step described below, the handling in which the cavity plate 1 and the electrode substrate 2 are made to be an equal potential becomes difficult. Therefore, the amount is appropriately determined in consideration of them.

Here, the diaphragm 4 is formed from the boron-doped layer as described above. Therefore, the resistance is lower than the resistance in the case where the diaphragm 4 is simply formed from silicon without doping of silicon with boron. From this point of view, the low voltage drive becomes possible.

In the present embodiment, the insulating film to be converted to the electret is formed from the silicon oxide film, as described above. However, other films, e.g., silicon oxynitride, tantalum oxide, hafnium-nitride silicate, or hafnium-oxynitride silicate, may be used. It is essential only that the insulating film can be converted to the electret.

As described above, according to the present first embodiment, since the insulating film 4a is converted to the electret so as to be electrified in advance, low voltage drive becomes possible. Therefore, the electrostatic actuator, and by extension the droplet discharge head 100 can be made denser and be miniaturized. Since the space including the insulating film 4a is sealed by the sealing component 10b, an occurrence of a problem that water or the like enters the space and adheres to the surface of the insulating film 4a and, thereby, the amount of electric charge is reduced can be prevented. Since the diaphragm 4 is formed from the boron-doped layer in which silicon has been doped with boron, the resistance is lower than the resistance in the case where the diaphragm 4 is simply formed from silicon. From this point of view as well, the low voltage drive becomes possible.

Second Embodiment

A method for manufacturing the droplet discharge head incorporating the electrostatic actuator of the first embodiment will be described below with reference to FIG. 4 to FIG. 8.

Figure 4:
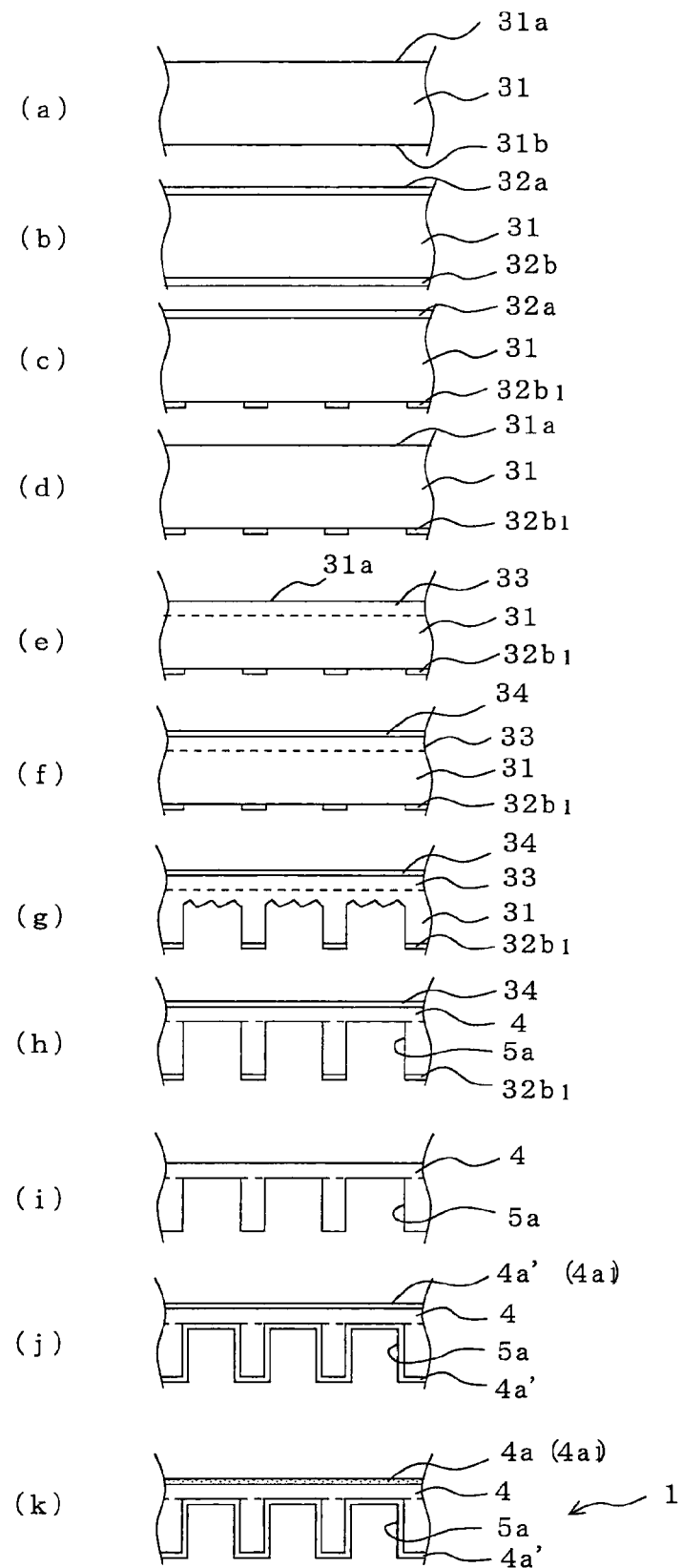
FIG. 4 is a diagram showing a manufacturing process of a cavity plate shown in FIG. 1.

A method for manufacturing the cavity plate 1 will be described with reference to FIG. 4.

As shown in FIG. 4(a), both surfaces of a silicon substrate exhibiting (110) surface orientation and having a low oxygen concentration are mirror-finished, so that a silicon substrate 31 having a thickness of about 140 µm is prepared.

A combination cleaning of APM cleaning (cleaning with a mixed solution (APM: ammonium hydroxide/hydrogen peroxide/water mix) of ammonia ($NH_4OH$), hydrogen peroxide ($H_2O_2$), and pure water ($H_2O$)) for cleaning fine particles adhered to the silicon substrate 31 and the above-described HPM cleaning (cleaning with a mixed solution (HPM: hydrochloric acid/hydrogen peroxide/water mix) of hydrochloric acid (HCl), hydrogen peroxide ($H_2O_2$), and pure water ($H_2O$)) for cleaning metals adhered to the silicon substrate 31 is conducted, so that foreign matters, which exert influences on the processing precision, are removed. The cleaning method is not necessarily limited to the APM cleaning and HPM cleaning, as long as particles and metals can be removed.

The silicon substrate 31 is put into a thermal oxidation furnace, and is subjected to a thermal oxidation treatment in an atmosphere of oxygen and steam under the condition of, for example, 1,075° C. and 4 hours, so that silicon oxide films 32a and 32b having a thickness of 1.2 µm are formed on the surface 31a and the back surface 31b of the silicon substrate 31, as shown in FIG. 4(b). In this case, both the temperature in the thermal oxidation furnace when the silicon substrate 31 is put into the thermal oxidation furnace and the temperature in the thermal oxidation furnace when the silicon substrate 31 is taken out of the thermal oxidation furnace are set at 800° C. (or more). By setting the temperatures as described above, a temperature range (500° C. to 700° C.), in which the oxygen defect growth rate in the silicon substrate 31 is high, can be passed promptly, so that an occurrence of oxygen defect in the silicon substrate 31 can be suppressed.

A photoresist (not shown in the drawing) is applied all over the surfaces of the silicon oxide films 32a and 32b. A photoresist pattern, although not shown in the drawing, is formed by using a photolithography technology, in which the photoresist applied all over the surface of the silicon oxide film 32b is exposed with a mask aligner and, thereafter, development is conducted with a developing solution, in order to remove the regions corresponding to the portions to become the concave portions 5a and 5b in a later step (refer to FIG. 1) from the silicon oxide film 32b.

Unnecessary portions of the silicon oxide film 32b are removed by using a wet etching technology with a hydrofluoric acid (HF) based etching solution, for example, ammonium hydrogen difluoride aqueous solution, that is, buffer hydrogen fluoride (BHF), or the like. Thereafter, the above-described photoresist pattern and the photoresist applied all over the surface of the silicon oxide film 32a are removed, so that a pattern $32b_1$ is produced, as shown in FIG. 4(c).

A photoresist (not shown in the drawing) is applied all over the surface of the back surface 31b of the silicon substrate 31 including the pattern $32b_1$. Thereafter, the silicon oxide film 32a is removed with a hydrofluoric acid (HF) based etching solution, e.g., buffer hydrogen fluoride (BHF), by using the photoresist as a protective film of the back surface 31b of the silicon substrate 31. Subsequently, the above-described photoresist applied all over the back surface 31b of the silicon substrate 31 is removed (refer to FIG. 4(d)).

The surface 31a of the silicon substrate 31 is allowed to face a diffusion source of a solid containing boron oxide (boron) ($B_2O_3$) as a primary component, and these are set on a quartz board. The resulting quartz boat is set in a vertical furnace, the inside of the vertical surface is brought into a nitrogen atmosphere, and the temperature is increased to 1,050° C. and is kept in that condition for 7 hours, so that boron is allowed to diffuse into the silicon substrate 31, and a boron-doped layer 33 (the concentration of boron is $1.0 \times 10^{20}$ atoms/cm$^3$) having a thickness of 0.8 μm is formed, as shown in FIG. 4(e). In this case as well, both the temperature in the vertical furnace when the silicon substrate 31 is put into the thermal oxidation furnace and the temperature in the vertical furnace when the silicon substrate 31 is taken out of the thermal oxidation furnace are set at 800° C. (or more). The reason for the adoption of this setting temperature is similar to that in the case where the above-described silicon oxide films 32a and 32b are formed.

Boron compounds, although not shown in the drawing, are formed on the surface 31a of the silicon substrate 31 of the boron-doped layer. These boron compounds are oxidized in an atmosphere of oxygen and steam under a condition of, for example, 600° C. simply for 1 hour and 30 minutes so as to be chemically converted to ($B_2O_3+SiO_2$). Since the boron compounds are converted to ($B_2O_3+SiO_2$), it is possible to conduct etching with a hydrofluoric acid (HF) based etching solution, e.g., buffer hydrogen fluoride (BHF). A photoresist (not shown in the drawing) is applied all over the surface of the back surface 31b of the silicon substrate 31 including the pattern $32b_1$. Thereafter, ($B_2O_3+SiO_2$) is removed with a hydrofluoric acid (HF) based etching solution, e.g., buffer hydrogen fluoride (BHF), by using the photoresist as a protective film of the back surface 31b of the silicon substrate 31. Subsequently, the above-described photoresist applied all over the back surface 31b of the silicon substrate 31 is removed.

As shown in FIG. 4(f), a TEOS film 34 having a thickness of 3.0 μm is formed on the surface of the boron-doped layer 33 by using a plasma chemical vapor deposition (CVD) apparatus under the condition that the treatment temperature during film formation is 360° C., the high-frequency output is 700 W, the pressure is 33.3 Pa (250 mTorr), and for the gas flow rate, the TEOS flow rate is 100 cm$^3$/min (100 sccm) and the oxygen flow rate is 1,000 cm$^3$/min (1,000 sccm). The silicon substrate 31 having been subjected to the manufacturing step shown in FIG. 4(f) is immersed in a potassium hydroxide (KOH) aqueous solution having a concentration of 35 percent by weight, and wet etching is conducted until the thickness of a portion, on which the pattern $32b_1$ is not provided, of the silicon substrate 31 reaches about 10 μm, as shown in FIG. 4(g). Subsequently, the silicon substrate 31 having been subjected to the manufacturing step shown in FIG. 4(g) is immersed in a potassium hydroxide (KOH) aqueous solution having a concentration of 3 percent by weight, and wet etching is conducted until the boron-doped layer 33 appears.

Consequently, as shown in FIG. 4(h), the above-described boron-doped layer 33 becomes the diaphragm 4 constituting the discharge chamber 5, and the concave portion 5a is formed in which the diaphragm 4 serves as the bottom wall (refer to FIG. 1). As described above, the diaphragm 4 is composed of the high concentration boron-doped layer 33, and has a desired thickness (in the present case, 0.8 μm). This is for the following reason. That is, when silicon is subjected to anisotropic etching by using an alkaline aqueous solution (alkaline anisotropic etching), the etching rate is significantly decreased in a high concentration (about $5 \times 10^{19}$ atoms/cm$^3$ or more) boron diffusion region. Therefore, in the present second embodiment, this phenomenon is used. The region, in which the diaphragm 4 of the silicon substrate 31 is formed, is specified to be the high concentration boron-doped layer 33. When the concave portion 5a constituting the discharge chamber 5 is formed by the alkaline anisotropic etching, a so-called etching stop technology, in which the etching rate is significantly decreased at the point in time when the boron-doped layer 33 is exposed, is used, and the thickness of the diaphragm 4 and the volume of the discharge chamber 5 is formed with high precision. Here, the etching stop refers to a state in which the bubble generation from an etching surface is stopped. In the actual etching, it is assumed that the stop of the bubble generation indicates the stop of etching.

Subsequently, the pattern $32b_1$ and the TEOS film 34 are removed by using a wet etching technology with, for example, a hydrofluoric acid (HF) based etching solution (refer to FIG. 4(i)). The silicon substrate 31 is subjected to an $O_2$ plasma treatment for 1 minute by using a plasma CVD apparatus. For the treatment condition of the $O_2$ plasma treatment, for example, the temperature is 360° C., the pressure is 66.7 Pa (0.5 Torr), the oxygen flow rate is 1,000 cm$^3$/min (1,000 sccm), and the high-frequency output is 250 W. The entire surface of the silicon substrate 31 is cleaned by this $O_2$ plasma treatment, and the uniformity of the withstand voltage of the insulating film 4a formed in a later step can be improved.

The entire surface of a single crystal silicon substrate 51 is subjected to a thermal oxidation treatment in an atmosphere of oxygen containing steam, so that a silicon oxide film (insulating film) 4a' having a thickness of 0.1 μm is formed (refer to FIG. 4(j)). This thermal oxidation treatment is conducted at a temperature of 1,000° C. for about 3.5 hours. Explanations of a method for forming the concave portion 6a and the electrode terminal 7 constituting the cavity plate 1 will not be provided.

An insulating film $4a_1$, which is the surface on the side facing the individual electrode 11, in the insulating film $4a'$ formed all over the single crystal silicon substrate 51 is converted to an electret, an insulating film 4a, so that the cavity plate 1 is completed (refer to FIG. 4(k)). Examples of electrification methods for converting the insulating film (silicon oxide film) $4a_1$ to the electret include corona discharge, a thermal electret method, and an electron beam method. In the present embodiment, the electrification is conducted by the corona discharge.

Figure 5:
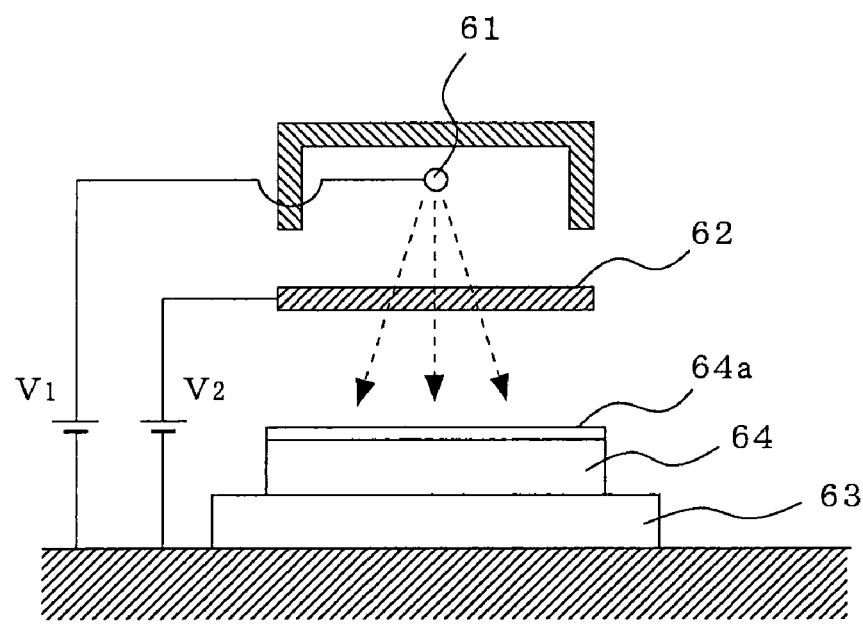
FIG. 5 is a diagram showing the configuration of an electrifier by using corona discharge.

FIG. 5 is a diagram showing the configuration of an electrifier by using corona discharge.

This electrifier includes a wire electrode 61 formed from tungsten and a grid electrode 62 configured into the shape of a grid, and electrifies a silicon oxide film 64a of the silicon substrate 64 placed on a stage 63 by applying a high voltage V1 to the wire electrode 61 and a low voltage V2 to the grid electrode. When positive electrification is conducted, positive voltages are applied as the high voltage V1 and the low voltage V2, and when negative electrification is conducted, negative voltages are applied as the high voltage V1 and the low voltage V2. A voltage adequate for effecting corona discharge of the wire is applied as the high voltage V1, and the low voltage V2 is set at a value within the range that does not cause electrical breakdown of the electret. In the present embodiment, an application of a voltage of 2 kV is conducted in an atmosphere at 100° C. for about 1 hour by using this electrifier, and the insulating film $4a_1$ (refer to FIG. 4(j)) is allowed to carry electric charge corresponding to 24 V, so that the insulating film 4a, which has been converted to the electret, is produced.

Figure 6:
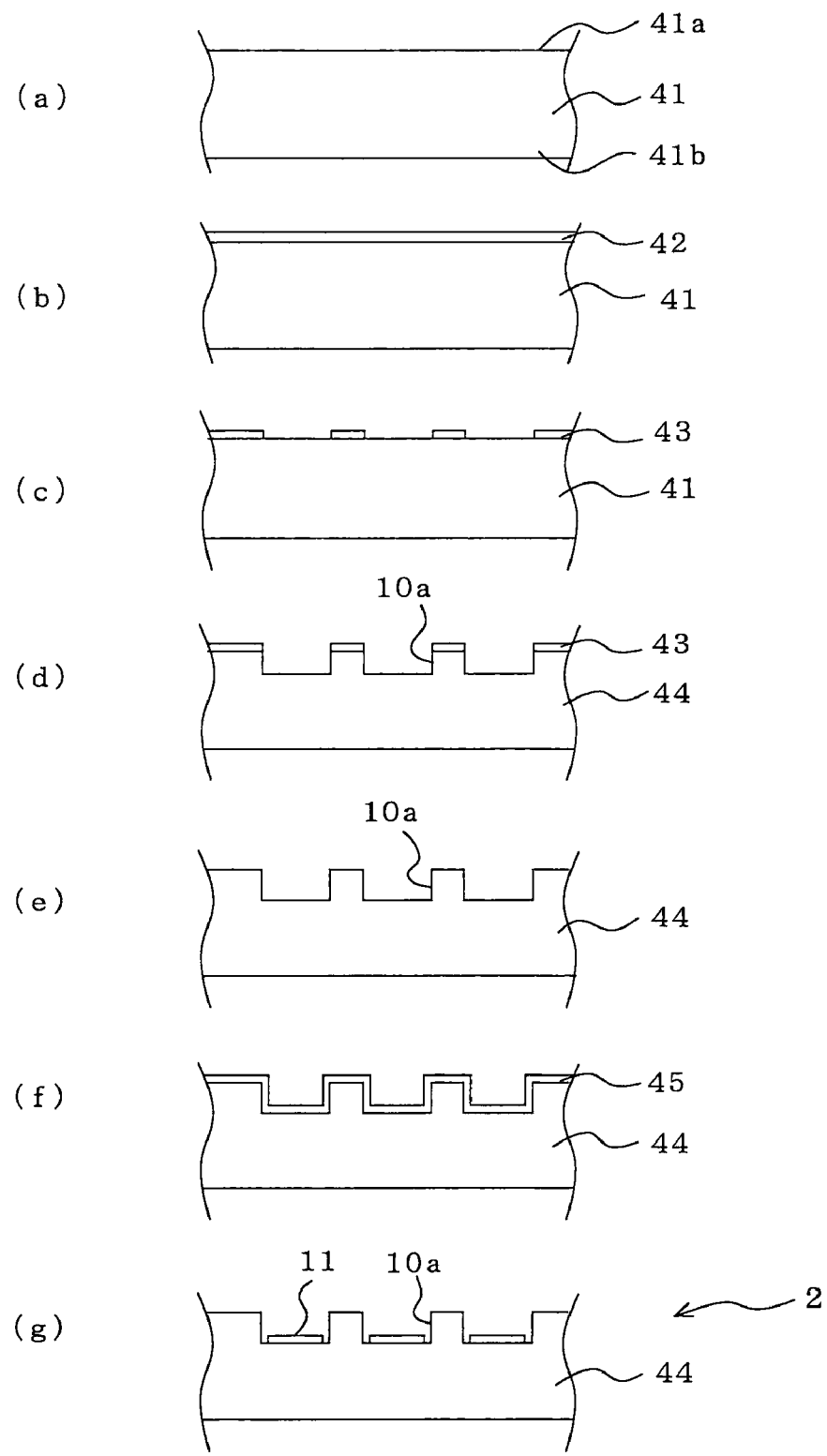
FIG. 6 is a diagram showing a manufacturing process of an electrode substrate shown in FIG. 1.

A method for manufacturing the electrode substrate 2 will be described below with reference to FIG. 6. Both surfaces of borosilicate based heat-resistant hard glass ($SiO_2$, $B_2O_3$) are mirror-finished, so that a glass substrate 41 having a thickness of about 1 mm is prepared, as shown in FIG. 6(a). A metal film 42 of gold (Au), chromium (Cr), or the like is formed on the surface 41a of the glass substrate 41, as shown in FIG. 6(b), by using a CVD apparatus or a physical vapor deposition (PVD) apparatus. Examples of PVD apparatuses include a sputtering apparatus, an evaporation apparatus, and an ion plating apparatus. The film thickness of the metal film 42 is specified to be, for example, 0.1 μm. Specifically, for the chromium (Cr) film, it is better that the film thickness is set at 0.1 μm. However, for the gold (Au) film, since the adhesion to the glass substrate 41 is not satisfactory, a chromium (Cr) film having a film thickness of, for example, 0.03 μm is formed and, thereafter, a gold (Au) film having a film thickness of, for example, 0.07 μm is formed.

A photoresist (not shown in the drawing) is applied all over the surface of the metal film 42. A photoresist pattern (not shown in the drawing) is formed by using the above-described photolithography technology, in order to form portions, which are to become electrode concave portions 10a and channels of the electrode portion in a later step (refer to FIG. 1), in the metal film 42 in such a way that the intervals and the shapes become substantially equal to the diaphragm 4 constituting the cavity plate 1. Unnecessary portions of the metal film 42 are removed by using a wet etching technology with an etching solution, for example, a mixed solution of ammonium ceric nitrate aqueous solution and perchloric acid aqueous solution (hereafter referred to as a metal etching solution), so that an etching pattern 43 is produced, as shown in FIG. 6(c).

The glass substrate 41 having been subjected to the manufacturing step shown in FIG. 6(c) is immersed in, for example, a hydrofluoric acid (HF) based etching solution, and, as shown in FIG. 6(d), wet etching of portions, where an etching pattern 43 is not disposed, of the glass substrate 41 is conducted by about 0.25 μm by using the etching pattern 43 as a mask, so that electrode concave portions 10a are formed. Subsequently, the resist pattern, although not shown in the drawing, used in the formation of the etching pattern 43 is removed. Unnecessary portions of the metal film 42 are removed by using the wet etching technology with the above-described metal etching solution, so that a glass substrate 44 including the electrode concave portions 10a, as shown in FIG. 6(e), is produced.

A photoresist (not shown in the drawing) is applied all over the surface of the glass substrate 44. A photoresist pattern (not shown in the drawing) is formed by using the above-described photolithography technology, in order to protect portions other than the portions to become individual electrodes 11 in a later step. Subsequently, as shown in FIG. 6(f), an electrode film 45 is formed on the surface of the glass substrate 44 provided with this photoresist pattern not shown in the drawing by sputtering tin oxide-doped ITO (ITO: Indium Tin Oxide) of, for example, 0.1 μm thickness with a CVD apparatus. In addition, tin oxide ($SnO_2$), indium oxide ($In_2O_3$), or the like may be used for the electrode film.

A photoresist (not shown in the drawing) is applied all over the surface of the glass substrate 44 having been subjected to the manufacturing step shown in FIG. 6(f). Thereafter, a photoresist pattern (not shown in the drawing) is formed by using the above-described photolithography technology, in order to leave the portions to become individual electrodes 11 in a later step. Unnecessary portions of the electrode film 45 are removed by using the wet etching technology with an etching solution, for example, a mixed solution of nitric acid and hydrochloric acid, so that individual electrodes 11 shown in FIG. 6(g) are formed in the inside of the electrode concave portions 10a. Although not shown in the drawing, liquid supply holes 17 shown in FIG. 1 and FIG. 2 are formed by using a drill, so that the electrode substrate 2 is produced. The explanations of formation of lead portions 12, terminal portions 13, and other components constituting the electrode substrate 2 are not provided.

A method for manufacturing nozzle plate 3 will be described below with reference to FIG. 7.

A single crystal silicon substrate 51 is prepared (refer to FIG. 7(a)). The single crystal silicon substrate 51 is subjected to a thermal oxidation treatment in an atmosphere of oxygen containing steam, so that silicon oxide films 52 having a thickness of about 1.8 μm are formed on a surface 51a and a back surface 51b (refer to FIG. 7(b)). Portions 20c, which correspond to first channels 20a of the nozzles 20, of the back surface 51b of the single crystal silicon substrate 51 are patterned by photolithography, and the silicon oxide film 52 of these portions are removed by etching (refer to FIG. 7(c)). The patterning is conducted by applying a resist to portions (including the surface 51a of the single crystal silicon substrate 51), from which the silicon oxide film 52 is not removed.

Portions 20d, which correspond to second channels 20b of the nozzles 20, of the back surface 51b of the single crystal silicon substrate 51 are patterned by photolithography, and the silicon oxide film 52 of these portions are half-etched (refer to FIG. 7(d)). The patterning is conducted as shown in FIG. 7(d), and the half-etching is conducted in such a way that the silicon oxide film of 1.0 µm thickness is left.

The back surface 51b of the single crystal silicon substrate 51, in which the silicon oxide film 52 have been half-etched as shown in FIG. 7(d), is subjected to anisotropic dry etching through ICP (inductively coupled plasma) discharge, and the etching is conducted up to the depth of 22 µm. At this time, remaining portions of the silicon oxide film 52 (including portions half-etched) are not etched. Thereafter, the single crystal silicon substrate 51 is etched with a hydrofluoric acid aqueous solution and, thereby, the thickness is decreased by the thickness of the silicon oxide film 52 remaining in the portion half-etched. At this time, the silicon oxide film 52 is entirely removed from the half-etched portion shown in FIG. 7(d), and the thicknesses of the silicon oxide film 52 of the other portions are decreased correspondingly to the etching. Subsequently, the back surface 51b is subjected again to anisotropic dry etching through ICP discharge, and the etching is conducted by 55 µm. Consequently, the portions 20c corresponding to the first channels 20a of the nozzles 20 are etched by 77 µm, and the portions 20d corresponding to the second channels 20b of the nozzles 20 are etched by 55 µm. The single crystal silicon substrate 51 is immersed in a hydrofluoric acid aqueous solution and, thereby, the remaining silicon oxide film 52 is entirely removed (refer to FIG. 7(e)).

In the step shown in FIG. 7(e), since the first channels 20a of the nozzles 20 and the second channels 20b of the nozzles 20 are formed by anisotropic dry etching through ICP discharge, the etching can be conducted perpendicularly to the single crystal silicon substrate 51, and highly precise nozzles 20 can be formed. Furthermore, since the nozzles 20 are two-stage nozzles, the stream of droplets is adjusted in the second channels 20b, and the rectilinearity in the discharge of droplets can be enhanced.

Figure 7:
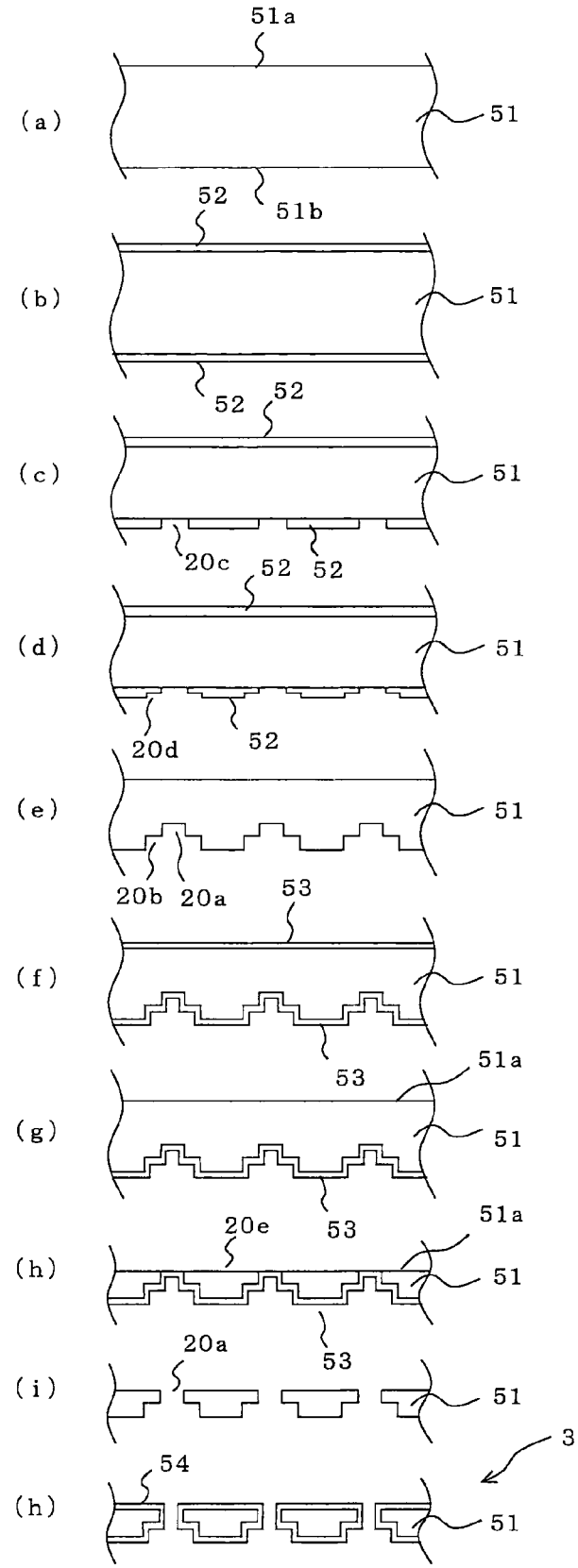
FIG. 7 is a diagram showing a manufacturing process of a nozzle plate shown in FIG. 1.

The single crystal silicon substrate 51 is subjected to a thermal oxidation treatment in an atmosphere of oxygen containing steam, so that a silicon oxide film 53 having a thickness of 1.2 µm is formed all over the surface (refer to FIG. 7(f)). This thermal oxidation treatment is conducted in an oxygen atmosphere containing steam at a temperature of 1,075° C. for about 4 hours. Portions to be provided with concave portions 20e to open the nozzles 20 are formed on the surface 51a of the single crystal silicon substrate 51 (refer to FIG. 7(h)) are patterned by photolithography, and the silicon oxide film 53 of these portions are removed by etching (refer to FIG. 7(g)). In FIG. 7, a cross-section of the nozzle plate 3 in a minor width direction is shown. Therefore, in FIG. 7(g), the state in which the silicon oxide film 53 formed on the surface 51a is entirely removed is shown. The patterning is conducted as shown in FIG. 7(c).

The single crystal silicon substrate 51 is immersed in a 25 percent by weight potassium hydroxide aqueous solution and, thereby, etching is conducted by 103 µm from the portion where the silicon oxide film 53 is removed in the step shown in FIG. 7(g) (refer to FIG. 7(h)). In the step shown in FIG. 7(g), the etching proceeds on the skew from the surface 51a of the single crystal silicon substrate 51. Therefore, in the step shown in FIG. 7(g), patterning is conducted in accordance with that. The concave portions 20e are formed in order to ensure the thickness of the single crystal silicon substrate 51 of the portions other than the periphery portions of the nozzles 20. However, the first channels 20a and the second channels 20b may be formed deeply in the step shown in FIG. 7(g), and the concave portions 20e may not be formed.

The silicon oxide film 53 remaining on the single crystal silicon substrate 51 is removed with a hydrofluoric acid aqueous solution and, thereby, the first channels 20a of the nozzles 20 are allowed to penetrate (refer to FIG. 7(i)). Finally, the entire surface of the single crystal silicon substrate 51 is subjected to a thermal oxidation treatment in an atmosphere of oxygen, so that a silicon oxide film 64 having a thickness of 0.1 µm is formed and the nozzle plate 3 is completed (refer to FIG. 7(j)). This thermal oxidation treatment is conducted at a temperature of 1,000° C. for about 3.5 hours. The silicon oxide film 64 is formed finally to prevent etching by droplets, e.g., ink, and conduct a water repellency treatment of the side surfaces of nozzles 20 and the periphery portions thereof. The orifice 21 and the reservoir diaphragm 22 are formed simultaneously with the formation of the nozzles 20 or by a separate etching step.

Figure 8:
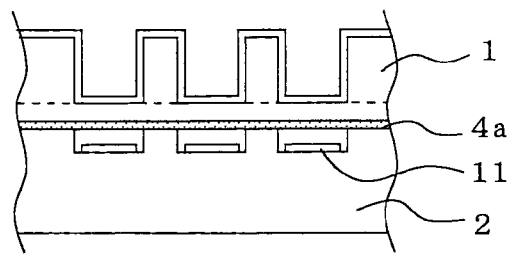
FIG. 8 is a diagram showing a manufacturing process of a droplet discharge head (No. 1).

The cavity plate 1 and the electrode substrate 2 produced by the above-described manufacturing methods are joined as shown in FIG. 8. In the present embodiment, since the electrode substrate 2 is composed of borosilicate glass, the cavity plate 1 and the electrode substrate 2 are joined by anode coupling. In the case where the electrode substrate 2 is composed of a silicon substrate, joining may be conducted by an adhesive.

In the anode coupling, the cavity plate 1 and the individual electrodes 11 are allowed to become at the same potential. In the present embodiment, since the insulating film 4a of the cavity plate 1 has been converted to the electret and is electrified by an equivalent to 24 V, the electric charge required to cancel the amount of electric charge of the insulating film 4a is applied to the individual electrodes 11 to attain the same potential and, thereafter, the anode coupling is conducted. Here, the anode coupling is conducted through the steps described below. A positive terminal of a direct-current power supply, although not shown in the drawing, is connected to the cavity plate 1 and a negative terminal of the above-described direct-current power supply is connected to the electrode substrate 2 while the cavity plate 1 is placed on the surface of the electrode substrate 2 in such a way as to face the diaphragm 4 and the individual electrodes 11. A direct current voltage on the order of a few hundred volts, for example, is applied between the cavity plate 1 and the electrode substrate 2, while the electrode substrate 2 is heated to a few hundred degrees centigrade, for example. When the electrode substrate 2 is heated, positive ions in the electrode substrate 2 tend to move. When these positive ions move in the electrode substrate 2, the joint surface of the electrode substrate 2 to the cavity plate 1 is relatively negatively electrified. On the other hand, the joint surface of the cavity plate 1 to the electrode substrate 2 is positively electrified. As a result, the cavity plate 1 and the electrode substrate 2 are joined strongly by the covalent bond in which silicon (Si) and oxygen (O) shares an electron pair.

Figure 9:
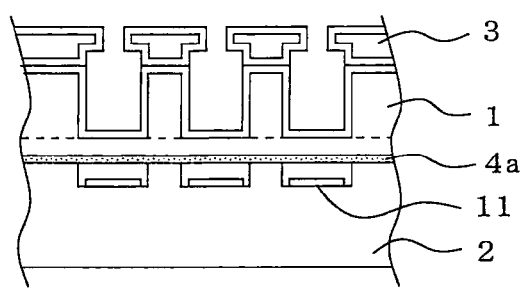
FIG. 9 is a diagram showing a manufacturing process of a droplet discharge head (No. 2).

As shown in FIG. 9, the nozzle plate 3 is joined to the cavity plate 1. In the case where the nozzle plate 3 is formed from silicon, the cavity plate 1 and the nozzle plate 3 are joined by using an adhesive so as to produce a joined material. The resulting joined material is cut by dicing, and furthermore, the driving circuit 23 is electrically connected to the terminal portion 13 and the electrode terminal 7. In addition, sealing with the sealing material 10b is conducted to prevent an adverse influence of contamination of foreign matters into the gap 10 or entrance of water or the like, so that the droplet discharge head 100 is completed.

The above-described manufacturing method is an example, and the method is not limited to those shown in the drawings. The droplet discharge head 100 may be produced by, for example, a process in which the silicon substrate 31 to become the cavity plate 1 is joined to the electrode substrate 2 in advance, and the concave portions 5a to become discharge chambers 5 and the like are formed on the silicon substrate 31.

Figure 10:
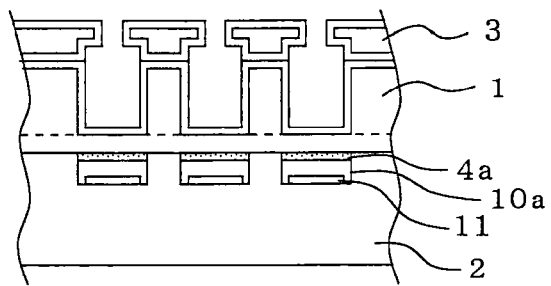
FIG. 10 is a diagram showing another configuration example of a droplet discharge head.

In the present first embodiment and the second embodiment, as shown in FIG. 2 and FIG. 9, the insulating film 4a converted to the electret is formed all over the surface on the electrode substrate 2 side of the cavity plate 1. However, as shown in FIG. 10, the insulating film 4a may be simply formed on the portions facing the electrode concave portions 10a, in the cavity plate 1. It is essential only that the insulating film 4a is formed on the portions of the surface, which faces the individual electrodes 11, of the diaphragm 4.

Third Embodiment

Figure 11:
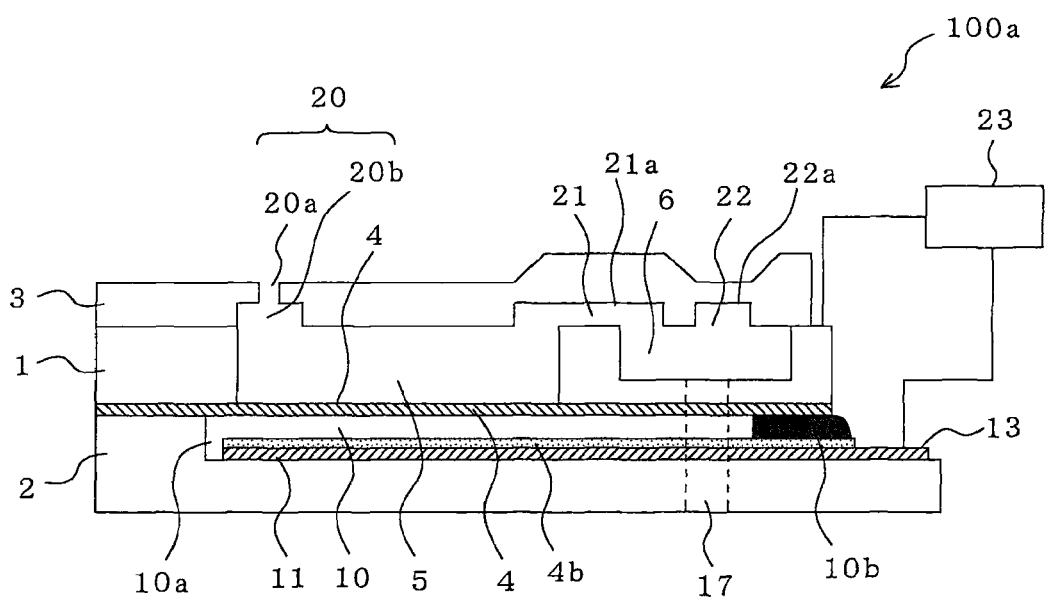
FIG. 11 is a schematic vertical sectional view of a droplet discharge head provided with the electrostatic actuator of the third embodiment.
Figure 12:
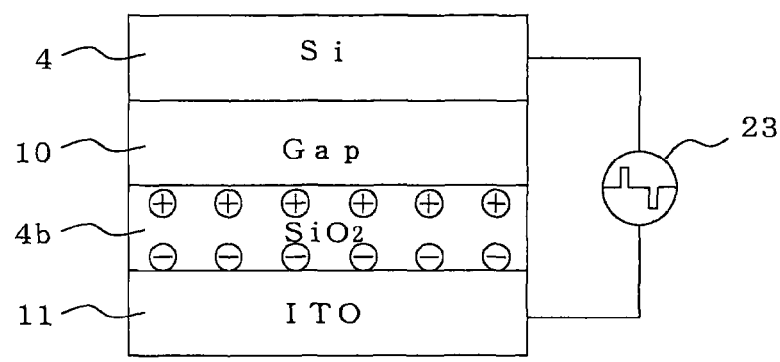
FIG. 12 is a schematic diagram of the configuration of the electrostatic actuator of the third embodiment.

FIG. 11 is a vertical sectional view of a droplet discharge head provided with an electrostatic actuator according to the third embodiment. FIG. 12 is a schematic diagram showing a magnified electrostatic actuator portion, that is, portions of the diaphragm 4, the insulating film 4a, the individual electrode 11, and the driving circuit 23, of the droplet discharge head shown in FIG. 11. In FIG. 11 and FIG. 12, the same portions as those shown in FIG. 2 and FIG. 3 of the first embodiment are indicated by the same reference numerals as those set forth above and explanations thereof will not be provided.

In a droplet discharge head 100a of the third embodiment, the insulating film to be converted to the electret is specified to be an insulating film 4b disposed on an upper surface of the individual electrodes 11 (surface facing the diaphragm 4) in stead of the insulating film 4b in the above-described first embodiment (refer to FIG. 2). This insulating film 4b is disposed on the upper surface of the individual electrodes 11 (surface facing the diaphragm 4) in order to prevent the short circuit and electrical breakdown between the individual electrodes 11 and the diaphragm 11 functioning as the common electrode on the side of individual discharge chambers 5.

The droplet discharge head 100a having the above-described configuration can exert the same operation and effect as those in the first embodiment.

Fourth Embodiment

Figure 13:
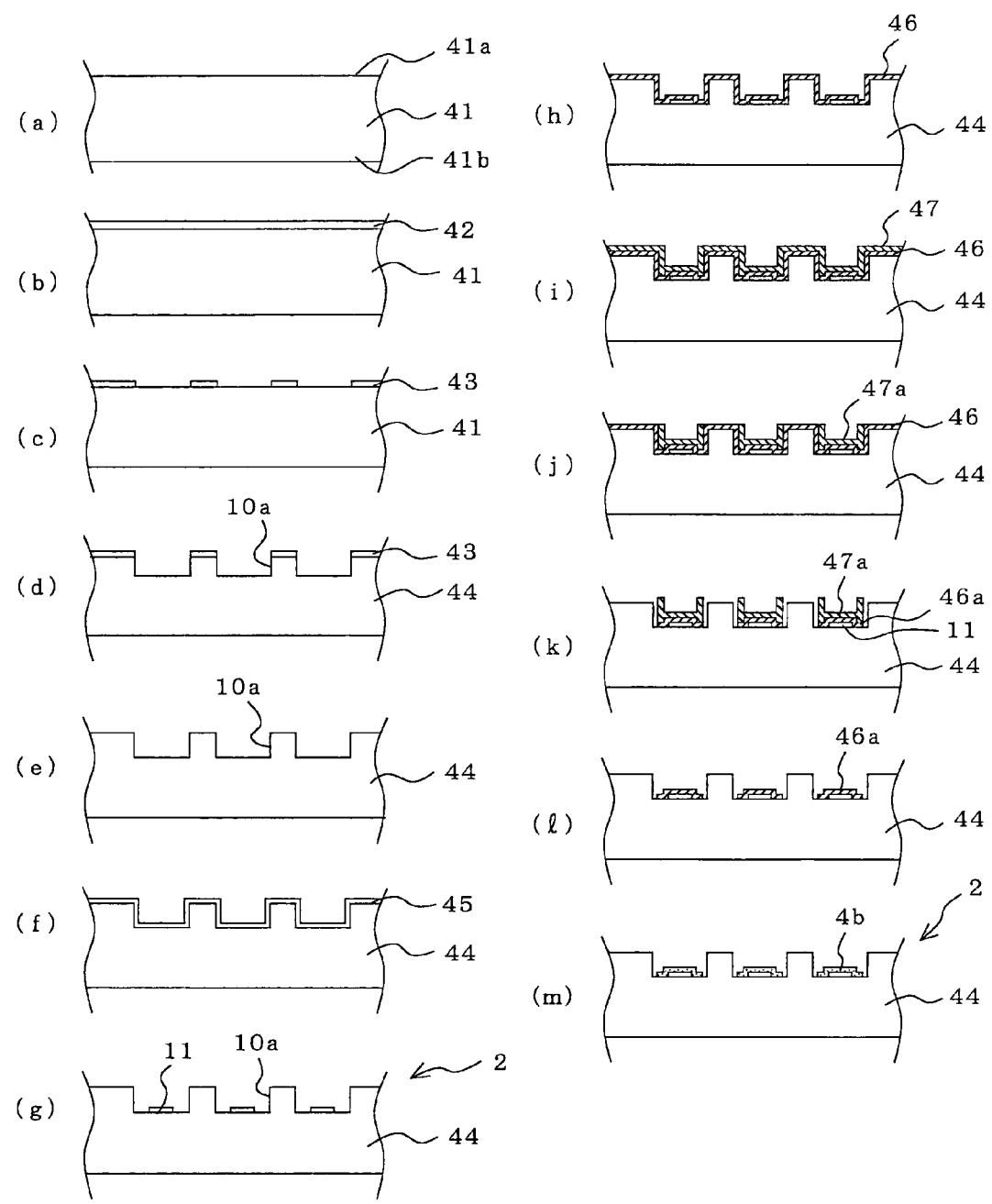
FIG. 13 is a diagram showing a manufacturing process of an electrode substrate shown in FIG. 11.

A method for manufacturing the droplet discharge head 100a incorporating the electrostatic actuator of the third embodiment will be described below with reference to FIG. 13. Since a method for manufacturing a cavity plate 1 of the droplet discharge head 100a is the same as that shown in FIG. 4(a) to FIG. 4(i), the explanations thereof will not be provided, and a method for manufacturing an electrode substrate 2 will be described with reference to FIG. 13.

Since FIGS. 13(a) to 13(g) are similar to FIGS. 6(a) to 6(g), the explanations thereof will not be provided, and FIG. 13(h) and later drawings will be described.

After the individual electrodes 11 are formed as shown in FIG. 13(g), the entire surface of a glass substrate 44 is subjected to a thermal oxidation treatment in an atmosphere of oxygen containing steam, so that a silicon oxide film (insulating film) 46 having a thickness of 0.1 μm is formed, as shown in FIG. 13(h). This insulating film 46 is formed by putting the glass substrate 44 into a thermal oxidation furnace, and conducting the thermal oxidation treatment under the condition of, for example, 3.5 hours at a temperature of 1,000° C. As shown in FIG. 13(i), a photoresist 47 is applied all over the surface of the insulating film 46. A photoresist pattern 47a as shown in FIG. 13(j) is formed by using the above-described photolithography technology, in order to remove regions other than the portions to become insulating film 4b of the insulating film 46, while the insulating film 4b is converted to the electret in a later step.

As shown in FIG. 13(k), unnecessary portions of the silicon oxide film 46 are removed by etching based on the dry etching technology and by using the above-described resist pattern 47a as a mask, so that the silicon oxide films 46a in the state of covering the individual electrodes 11 are produced. RIE (Reactive Ion Etching) is used for this dry etching technology. As shown in FIG. 13(l), the photoresist 47a is removed and, thereafter, the silicon oxide films 46a are converted to the electret to serve as the insulating films 4b, so that the electrode substrate 2 is completed (refer to 13(m)). The liquid supply holes 17 shown in FIG. 11 and FIG. 12 are formed so as to produce the electrode substrate 2. The explanations of formation of lead portions 12, terminal portions 13, and other components constituting the electrode substrate 2 are not provided.

Here, the insulating film 4b shown in FIG. 13(m) is formed in such a way as to cover the entire individual electrode 11. However, it is essential only that the insulating layer 4b is formed on at least the upper surface of the individual electrode 11 from the viewpoint of playing the role (prevention of the short circuit and electrical breakdown between the individual electrodes 11 and the diaphragm 4, realization of low voltage drive based on conversion to the electret) required of the insulating film 4b. Therefore, the insulating film 4b may be removed from other portions. Conversely, portions not required to play the above-described role remain in the insulating film 4b shown in FIG. 13(m), but no functional problem occurs. It is desirable that the unnecessary portions are removed in consideration of the stability of the amount of electric charge. However, complete removal is difficult in reality for the dry etching by using RIE.

With respect to the electrification method for converting the insulating film (silicon oxide film) 46a shown in FIG. 13(l) to the electret, the electrification may be conducted by corona discharge as in the second embodiment.

Figure 14:
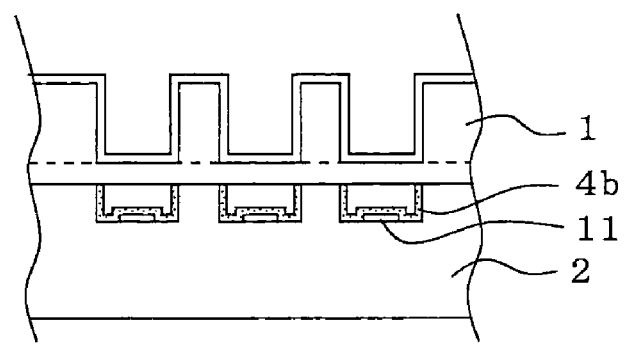
FIG. 14 is a diagram showing a manufacturing process of the droplet discharge head shown in FIG. 11 (No. 1).

The cavity plate 1 and the electrode substrate 2 produced by the above-described manufacturing methods are joined as shown in FIG. 14. In the present embodiment, since the electrode substrate 2 is composed of borosilicate glass, the cavity plate 1 and the electrode substrate 2 are joined by anode coupling. In the case where the electrode substrate 2 is composed of a silicon substrate, joining may be conducted by an adhesive.

In the anode coupling, the cavity plate 1 and the individual electrodes 11 are allowed to become at the same potential. In the present embodiment, since the insulating film 4b of the individual electrode 11 has been converted to the electret and is electrified by an equivalent to 24 V, the electric charge required to cancel the amount of electric charge of the insulating film 4b is applied to the cavity plate 1 to attain the same potential and, thereafter, the anode coupling is conducted. Here, the anode coupling is conducted through the steps described below. A positive terminal of a direct-current power supply, although not shown in the drawing, is connected to the cavity plate 1 and a negative terminal of the above-described direct-current power supply is connected to the electrode substrate 2 while the cavity plate 1 is placed on the surface of the electrode substrate 2 in such a way as to face the diaphragm 4 and the individual electrode 11. A direct current voltage on the order of a few hundred volts, for example, is applied between the cavity plate 1 and the electrode substrate 2, while the electrode substrate 2 is heated to a few hundred degrees centigrade, for example. When the electrode substrate 2 is heated, positive ions in the electrode substrate 2 tend to move. When these positive ions move in the electrode substrate 2, the joint surface of the electrode substrate 2 to the cavity plate 1 is relatively negatively electrified. On the other hand, the joint surface of the cavity plate 1 to the electrode substrate 2 is positively electrified. As a result, the cavity plate 1 and the electrode substrate 2 are joined strongly by the covalent bond in which silicon (Si) and oxygen (O) shares an electron pair.

Figure 15:
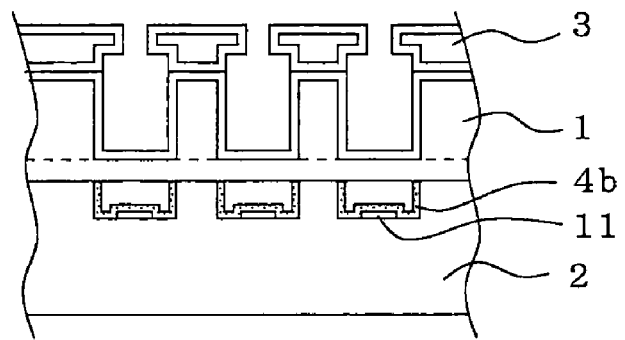
FIG. 15 is a diagram showing a manufacturing process of the droplet discharge head shown in FIG. 11 (No. 2).

As shown in FIG. 15, the nozzle plate 3 is joined to the cavity plate 1. In the case where the nozzle plate 3 is formed from silicon, the cavity plate 1 and the nozzle plate 3 are joined by using an adhesive so as to produce a joined material. The resulting joined material is cut by dicing, and furthermore, the driving circuit 23 is electrically connected to the terminal portion 13 and the electrode terminal 7. In addition, sealing with the sealing material 10*b* is conducted to prevent an adverse influence of contamination of foreign matters into the gap 10 or entrance of water or the like, so that the droplet discharge head is completed.

The above-described manufacturing method is an example, and the method is not limited to those shown in the drawings. The droplet discharge head may be produced by, for example, a process in which the silicon substrate 31 to become the cavity plate 1 is joined to the electrode substrate 2 in advance, and the concave portions 5*a* to become discharge chambers 5 and the like are formed on the silicon substrate 31.

Fifth Embodiment

Figure 16:
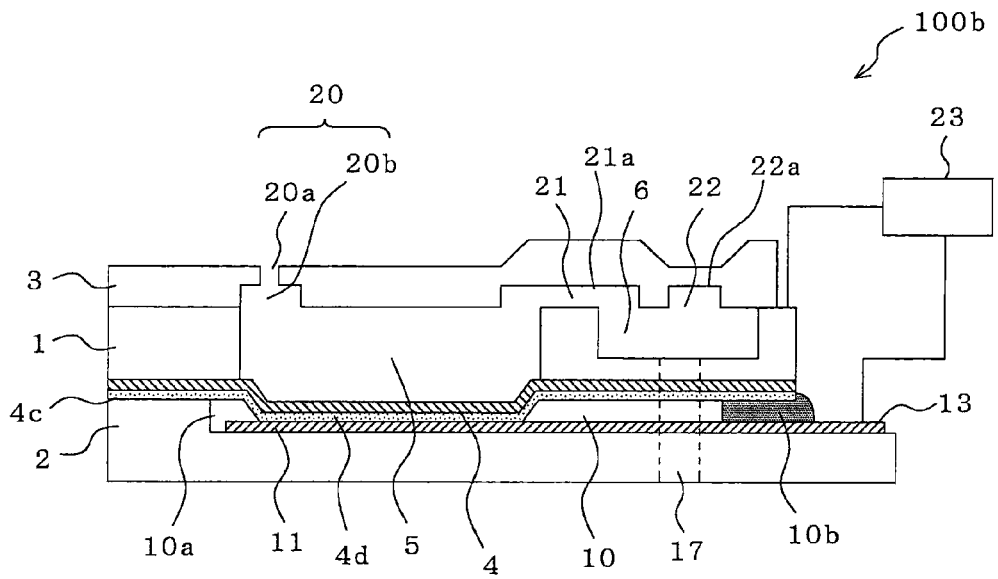
FIG. 16 is a schematic vertical sectional view of a droplet discharge head provided with the electrostatic actuator of the fifth embodiment.

FIG. 16 is a sectional view of a droplet discharge head provided with an electrostatic actuator according to the fifth embodiment. In FIG. 16, the same portions as those shown in FIG. 2 are indicated by the same reference numerals as those set forth above and explanations thereof will not be provided.

In a droplet discharge head 100*b* of the fifth embodiment, an insulating film 4*c* is disposed all over the surface on the electrode substrate 2 side of the cavity plate 1. This insulating film 4*c* is previously disposed to prevent the short circuit and electrical breakdown between the diaphragm 4 functioning as the common electrode of individual discharge chambers 5 and individual electrodes 11 described below. Furthermore, in the present fifth embodiment, the portion, which face the individual electrode 11, of the insulating film 4*c* has been converted to an electret (a dielectric exhibiting permanent electric polarization), and carries a predetermined amount of electric charge in a state in which no voltage is applied. Hereafter, in the insulating film 4*c*, the portion converted to the electret is referred to as an electret portion 4*d*.

This electret portion 4*d* permanently maintains polarization even in a state in which no voltage is applied and no electric field is present in the outside, and has an effect of forming an electric field in relation to the surroundings. In a standby state (initial state) of a droplet discharge head 100*b* of the present embodiment, the diaphragm 4 and the individual electrode 11 are kept in the state of being detachably in contact with each other, as shown in FIG. 16, by an attraction force generated by an electric field based on the electret portion. In the present embodiment, for example, the insulating film 4*c* having a thickness of 0.1 μm is formed from a silicon oxide film ($SiO_2$ film). The conversion of the insulating film 4*c* to the electret is described below. The insulating film is disposed all over the outer surface of the cavity plate 1 in reality, but in FIG. 16, a portion, which has been converted to the electret, of the insulating film 4*c* is simply shown, and the other portion of the insulating film is not shown in the drawing.

Figure 17:
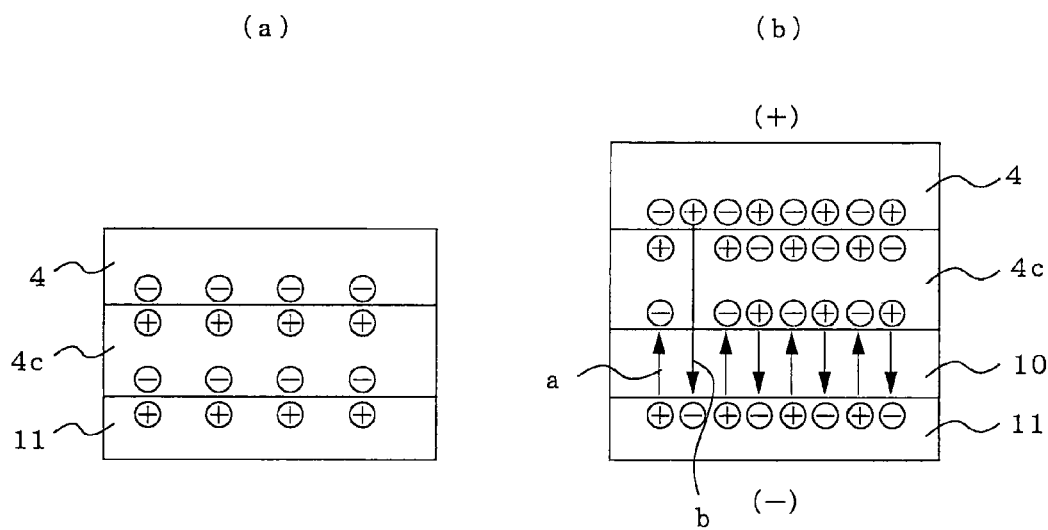
FIG. 17 is a schematic diagram of the configuration of the electrostatic actuator of the fifth embodiment.

The operation of the electrostatic actuator portion of the droplet discharge head 100*b* will be described below. FIG. 17 is a schematic diagram showing a magnified electrostatic actuator portion, that is, portions of the diaphragm 4, the electret portion 4*d*, and the individual electrode 11, of the droplet discharge head shown in FIG. 16. FIG. 17(*a*) shows a standby state and FIG. 17(*b*) shows a driving state. In contrast to the structure in the above-described first and third embodiments, the droplet discharge head 100*b* of the fifth embodiment has a structure in which the diaphragm 4 is detachably in contact with the individual electrode 11, in the standby state (initial state). Therefore, the operation of the electrostatic actuator specific to the structure will be described here.

As shown in FIG. 17(*a*), the electret portion 4*d* is in the state of being permanently polarized into a positive pole and a negative pole and carrying an electric charge. As described above, during standby, the diaphragm 4 is in the state of being attracted to and in contact with the individual electrode 11 by the attraction effect due to an electric field generated by the electret portion 4*d*. In the state indicated by the example shown in the drawing, since the individual electrode 11 side surface of the electret portion 4*d* has the negative charge, the positive charge appears on the electret portion 4*d* side surface of the individual electrode 11 in contact therewith, whereas the negative charge appears on the electret portion 4*d* side surface of the diaphragm 4.

Here, when a positive voltage is applied to the diaphragm 4, as shown in FIG. 17(*b*), an electric field (downward-pointing arrows b), which cancels the electric field generated by the electret portion 4*d* (upward-pointing arrows a), is formed in the electrostatic actuator. Consequently, the diaphragm 4 is detached from the individual electrode 11 by the restoring force of the diaphragm 4 itself, and a gap 10 is generated. Since the electric fields cancel each other out, no electric field is generated in the gap 10 in reality.

Figure 18:
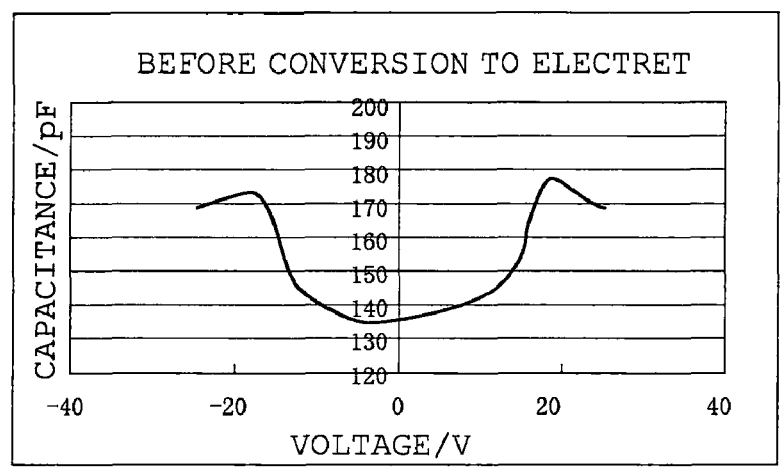
FIG. 18 is a diagram showing the relationship between the voltage applied to an electrostatic actuator and the capacitance of an insulating film.
Figure 18:
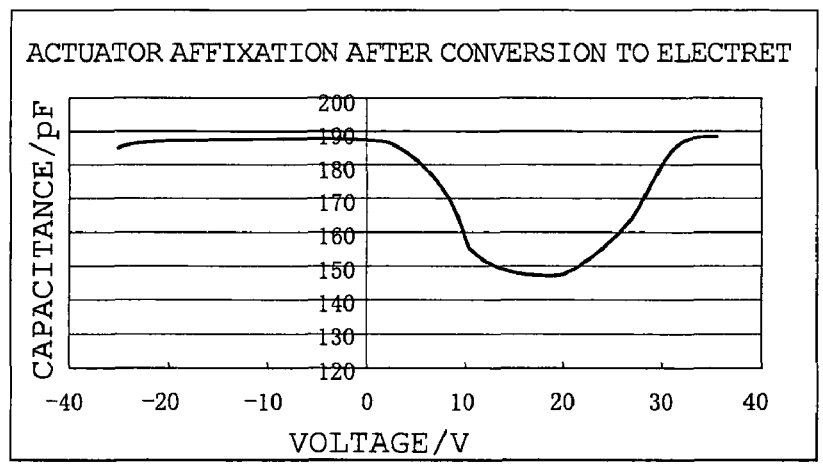

FIG. 18 is a diagram showing the relationship between the voltage applied to the electrostatic actuator and the capacitance of the electrostatic actuator. FIG. 18(*a*) shows the case where the insulating film 4*c* is not converted to the electret, and FIG. 18(*b*) shows the case where the insulating film 4*c* is converted to the electret. Here, the individual electrode 11 is specified to be at a GND potential, and a positive potential is applied to the common electrode.

As shown in FIG. 18(*a*), the capacitance is increased by increasing the voltage before conversion to the electret. On the other hand, as shown in FIG. 18(*b*), the capacitance is decreased gradually by increasing the voltage after conversion to the electret, and reaches a minimum when a voltage of about 15 V is applied. That is, by applying the voltage, at which the electrostatic force for attracting the diaphragm 4 to the individual electrode 11 becomes a minimum, to the electrostatic actuator, it becomes possible to operate in such a way that the diaphragm 4 is detached from the individual electrode 11 by the restoring force of the diaphragm 4 itself.

The electrostatic actuator of the present embodiment is an actuator which goes into a predetermined action (the droplet discharging action for a droplet discharge head) when the diaphragm 4 in the state of being in contact with the individual electrode 11 is operated in such a way as to detach from the individual electrode 11, as described above. In consideration of this, about 20 V is required as the driving voltage before conversion to the electret shown in FIG. 18(*a*), whereas only 15 V is required after conversion to the electret shown in FIG. 18(*b*). Consequently, an electrostatic actuator capable of being driven at a low voltage can be configured by disposing the electret portion 4*d* through the conversion of the insulating film 4*c* to the electret.

Figure 19:
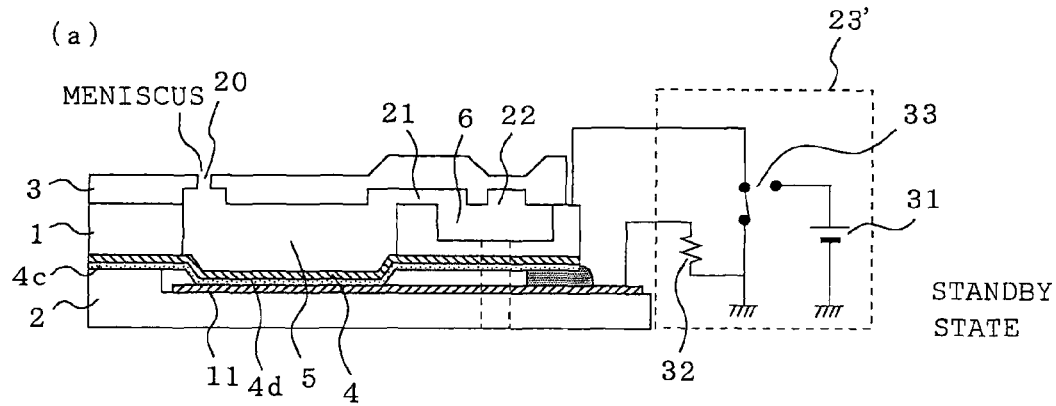
FIG. 19 is a diagram for explaining the principle of a method for driving a droplet discharge head.
Figure 19:
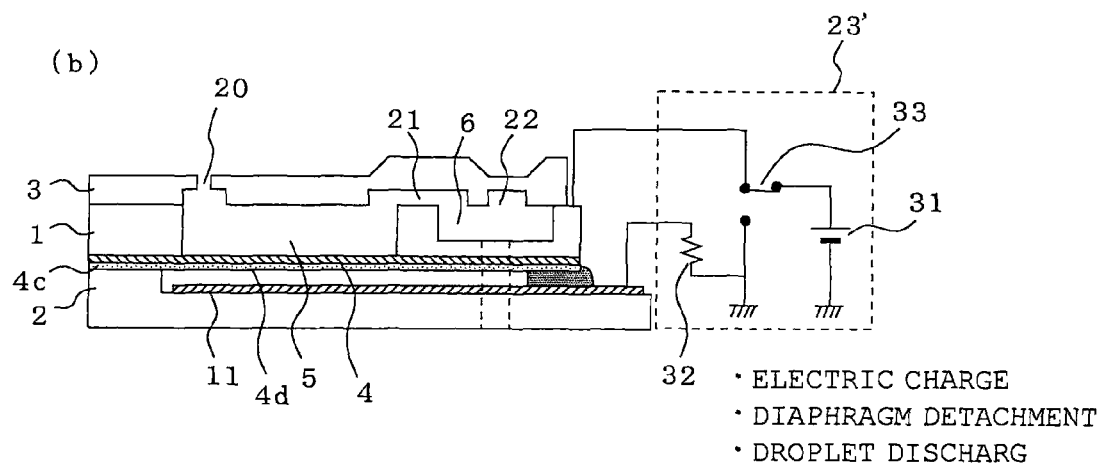
Figure 19:
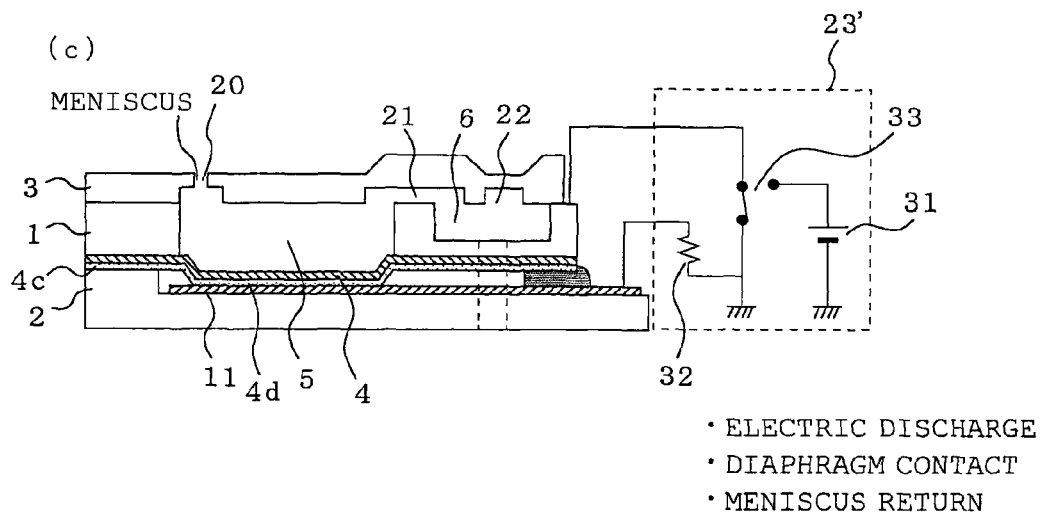

The principle of a method for driving the droplet discharge head 100 provided with the electrostatic actuator having the above-described configuration will be described below with reference to FIG. 19. In FIG. 19, a driving circuit 23' is provided with a power supply 31, a charge and discharge resistance 32, and a changeover switch 33 to switch between the power supply 31 and the charge and discharge resistance 32. The driving circuit 23' is configured to be able to apply a voltage for canceling the electric field based on the electret portion 4d when the changeover switch 33 is switched to the power supply 31 side, and is configured to be able to bring the diaphragm 4 and the individual electrode 11 at the same potential when the changeover switch 33 is switched to the charge and discharge resistance 32 side. The droplet flow paths, e.g., the nozzle 20 and the discharge chamber 5, are filled in with a liquid to be discharged.

In the standby state shown in FIG. 19(a), the changeover switch 33 is switched to the charge and discharge resistance 32 side, and the diaphragm 4 and the individual electrode 11 are allowed to be at the same potential. In this standby state, the diaphragm 4 is attracted to the individual electrode 11 side and is in the state of being in contact therewith by the effect of the electret portion 4d. Consequently, the volume of the discharge chamber 5 is increased, a meniscus is formed in the nozzle 20, and the liquid is held in the discharge chamber 5.

As shown in FIG. 19(b), when the changeover switch 33 is switched to the power supply 31 side and diaphragm (common electrode) 4 side is allowed to be at a positive potential, a positive electric charge is charged on the diaphragm 4 side, a negative electric charge is charged on the individual electrode 11 side, and the diaphragm 4 is detached from the individual electrode 11 by the storing force of the diaphragm 4 itself. Consequently, a pressure is applied to the liquid in the discharge chamber 5, and a droplet is discharged from the nozzle 20 by this pressure in the discharge chamber 5.

After the droplet is discharged, the changeover switch 33 is switched to the charge and discharge resistance 32 side in accordance with the residual vibration (1 period to 2 periods), mobile charge is discharged, so that the diaphragm 4 and the individual electrode 11 are allowed to become at the same potential. As a result, the diaphragm 4 is attracted to the individual electrode 11 side by the effect of the electret portion 4d and is returned to the standby state, as shown in FIG. 19(c). Consequently, the volume of the discharge chamber 5 is increased, droplets of ink or the like stored in the inside of the reservoir 6 are flown into the discharge chamber 5 through the orifice 21, and the meniscus in the nozzle 20 is retracted as well. Thereafter, the liquid to be discharged is drawn and returned to the nozzle 20 surface side by the surface tension and the residual vibration in the discharge chamber 5 and, thereby, the meniscus is returned to the opening position of the nozzle 20. In this manner, next droplet discharge becomes possible.

The timing of switching of the changeover switch 33 to the charge and discharge resistance 32 side will be described. This timing is allowed to agree with the residual vibration of the discharge chamber 5, as described above. That is, after the droplet is discharged, the diaphragm 4 repeats the vibration in which the diaphragm 4 moves again toward the individual electrode 11 side and, thereafter, moves again in the direction farther from the individual electrode 11. Consequently, the timing is specified to be the time when the diaphragm 4 reaches a point closest to the individual electrode 11. Put another way, this timing is the time when the droplet discharge operation is completed. Stable droplet discharge becomes possible by returning the diaphragm 4 to the standby state with this timing.

A specific configuration of a driving control device, to which the above-described driving method is applied, of the droplet discharge head 100 of the present invention will be described with reference to the following FIG. 20. FIG. 20 is a block diagram showing the configuration of a driving control device of a droplet discharge head. Here, in place of the charge and discharge resistance to control the charge and discharge rate, the slope of the voltage increase in the leading edge of the driving voltage pulse and the slope of the voltage decrease in the falling edge are formed by a driving voltage pulse formation circuit described below and, thereby, the charge and discharge rate is controlled.

The driving control device 40 is provided with a CPU 41. The CPU 41 is connected to a ROM 42, a RAM 43, and a data generator (D/G) 44 through an internal bus. A control program is stored in the ROM 42. The CPU 41 executes the control program stored in the ROM by using a storage area in the RAM 43 as a work area, and performs driving control of the droplet discharge head 100.

A power supply 45 generates a high voltage (Hv) for head driving, a power supply voltage (TTL) of the driving control device 40, and a GND potential from an external power supply voltage, supplies the high voltage (Hv) for head driving to a driving voltage pulse formation portion 46 and a nozzle selection IC 47, and supplies the power supply voltage (TTL) of the driving control device 40 to the CPU 41, a D/A converter 48, a gate array (G/A) 49, the data generator (D/G) 44, a clock generation portion 50, and the driving voltage pulse formation portion 46. For the droplet discharge head 100, a driving voltage pulse Vp is supplied from the driving voltage pulse formation portion 46 to the diaphragm 4, and a driving voltage pulse Vp or a GND potential is selectively supplied from the nozzle selection IC 49 to the individual electrode.

The printing information is supplied to the CPU 41 from an external apparatus, although not shown in the drawing, through an I/O, and the CPU 41 outputs the printing information to the data generator (D/G) 44. The data generator (D/G) 44 produces pattern data of images and characters on the basis of the printing information from the CPU 41, and outputs them to the gate array (G/A) 49.

The pattern data from the data generator (D/G) 44 is input into the gate array (G/A) 49, and a driving control signal corresponding to the pattern data is supplied to the nozzle selection IC 47.

On the other hand, the CPU 41 outputs control signals related to pulse signal waveform formation conditions, e.g., a pulse length of the driving signal, a voltage, a pulse rise time, and a fall time, to the D/A (digital-analog) converter 48. The D/A converter 48 converts the control signal supplied as digital information from the CPU 41 to analog data, and outputs to the driving voltage pulse formation portion 46.

The driving voltage pulse formation portion 46 produces the driving voltage pulse waveform Vp on the basis of data from the D/A converter 48, and outputs the resulting driving voltage pulse waveform Vp to the diaphragm 4 and the nozzle selection IC 47, independently.

The nozzle selection IC 47 is supplied with the driving control signal and the driving voltage pulse Vp, and is supplied with a clock signal from the clock generation portion (CLK) 50. The nozzle selection IC 47 selects the driving voltage pulse Vp or the ground potential GND on the basis of the driving control signal, and apply to the individual electrodes 11 corresponding to individual nozzles 20. Specifically, a GND potential is supplied to the nozzle 20 to be driven (a nozzle allowed to discharge a droplet) so as to cause a potential difference between the nozzle 20 and the diaphragm 4 and effect droplet discharge. The driving voltage pulse Vp is supplied to a nozzle 20 not to be driven (a nozzle not allowed to discharge a droplet), so that no potential difference is provided. Consequently, control is performed in such a way that a droplet is discharged from the nozzle 20 to be driven, and no droplet is discharged from the nozzle 20 not to be driven.

The driving control signal supplied from the gate array (G/A) 49 to the nozzle selection IC 47 is specifically a logic indicating presence or absence of printing data to each nozzle 20 (high logic H in the case where there is printing data, and low logic L in the case where there is no printing data), and is composed of serial data. The nozzle selection IC 47 converts the supplied serial data to parallel data, selects the driving voltage pulse Vp or the ground potential GND on the basis of the resulting parallel data, and apply to the individual electrodes 11 corresponding to individual nozzles 20.

FIG. 21 is a diagram showing a driving voltage pulse Vp applied between the diaphragm 4 and the individual electrode 11. FIG. 22 is a diagram showing a driving logic. In FIG. 21, the horizontal axis indicates the time, and the vertical axis indicates the voltage. One ink droplet discharge operation is performed on a pulse of driving voltage pulse Vp basis.

The driving voltage pulse Vp is composed of a charge portion P1, a voltage keeping portion P2, and a discharge portion P3. When the droplet discharge head 100 is driven, the Vp is supplied to the diaphragm (common electrode) 4 and, in addition, the GND potential is supplied to the individual electrode 11, so that charging is performed to supply the electric charge to the electrostatic actuator (the charge portion P1). The operation of the electrostatic actuator during the charging is as described above. The diaphragm 4 attracted to the individual electrode 11 by the effect of the electret portion 4d is detached from the individual electrode 11, a pressure is thereby generated in the discharge chamber 5, and a droplet is discharged from the nozzle 20.

Thereafter, the potential difference between the diaphragm 4 and the individual electrode 11 is kept (the voltage keeping portion), so that the diaphragm 4 is allowed to be in the free vibration state. Subsequently, the electric charge between the diaphragm 4 and the individual electrode 11 is discharged (the discharge portion P3). Consequently, the diaphragm 4 is attracted to the individual electrode 11 side so as to be brought into contact by the effect of the electret portion 4d and, therefore, is returned to the standby state.

Here, the timing of attraction of the diaphragm 4 once detached from the individual electrode 11 to the individual electrode 11 side again, that is, the timing of start of the electric discharge (the point in time of the falling of the driving voltage pulse Vp), is preferably specified to be the time when the diaphragm 4 reaches the point closest to the individual electrode 11 by the vibration of the diaphragm 4 itself, as described above. Specifically, the adjustment of the timing is conducted by adjusting the pulse width (the time period from the completion of electric charge to the completion of electric discharge) Pw of the driving voltage pulse Vp. For the above-described electrostatic actuator, the pulse width Pw is determined on the basis of the intrinsic frequency of the diaphragm 4. For the droplet discharge head 100, since the liquid to be discharged has an influence, the pulse width Pw is determined on the basis of the intrinsic vibration period of the droplet flow path, e.g., the nozzle 20 and the discharge chamber 5.

When the driving voltage pulse Vp having a pulse width pw determined on the basis of the intrinsic vibration period of the droplet flow path, as described above, is applied, stable droplet discharge driven efficiently at a low voltage becomes possible. Therefore, when this droplet discharge head 100 is used as an ink-jet head for discharging ink, a stable printing operation becomes possible, and an improvement in the printing quality is facilitated.

An individual electrode 11 of a nozzle 20 not to be driven is supplied with the same driving voltage pulse Vp as that for the diaphragm 4. Consequently, no potential difference between the diaphragm 4 and the individual electrode 11 occurs, the state in which the diaphragm 4 is in contact with the individual electrode 11 is maintained, and no droplet discharge is effected. The nozzle selection IC 47 selects which potentials to be supplied to the individual electrode 11. In the standby state in which no discharge operation is performed with any nozzle 20, both the diaphragm 4 and the individual electrode 11 are supplied with the GND potential.

As described above, according to the present fifth embodiment, the electret portion 4d is disposed between the diaphragm 4 and the individual electrode 11, and the initial state (standby state) is specified to be the state in which the diaphragm 4 is kept in contact with the individual electrode 11 by the effect of the electret portion 4d. Therefore, when a droplet is discharged, an application of only a voltage required to detach the diaphragm 4 from the individual electrode 11 (put another way, a voltage required to eliminate the attraction force generated by an electric field based on the electret portion 4d) is necessary. Consequently, low voltage drive becomes possible. That is, driving becomes possible at a voltage lower than the voltage required to attract the diaphragm 4 to the individual electrode 11 side under the influence of the droplet pressure in the discharge chamber 5. Put another way, a necessary and adequately large diaphragm displacement can be attained by the low voltage drive. As a result, the droplet discharge head 100 can be miniaturized and the discharge chamber can be made denser.

After the discharge operation is completed, the diaphragm 4 is returned to the standby state, and becomes in the state of being attracted to and held by the individual electrode 11, so that the compliance of the flow path of the discharge chamber 5 is small. Therefore, the time that elapsed before the residual vibration after the droplet discharge is converged can be reduced, and the meniscus can be returned promptly. Consequently, the time interval up to the next discharge can be reduced, and the droplet discharge head 100 can be driven at a high driving frequency.

Since the space including the electret portion 4d is sealed by the sealing component 10b, an occurrence of a problem that water or the like enters the space and adheres to the surface of the electret portion 4d and, thereby, the amount of electric charge is reduced can be prevented. Since the diaphragm 4 is formed from the boron-doped layer in which silicon has been doped with boron, the resistance is lower than the resistance in the case where the diaphragm 4 is simply formed from silicon. From this point of view as well, the low voltage drive becomes possible.

Sixth Embodiment

A method for manufacturing the droplet discharge head 100b incorporating the electrostatic actuator of the fifth embodiment will be described below with reference to FIG. 23. Since a method for manufacturing the structure itself of the droplet discharge head 100b is the same as that in the above-described second embodiment, the explanations thereof will not be provided. A method for converting the insulating film to the electret, the method being different from the methods explained in the above-described second and fourth embodiments, will be described.

Figure 23:
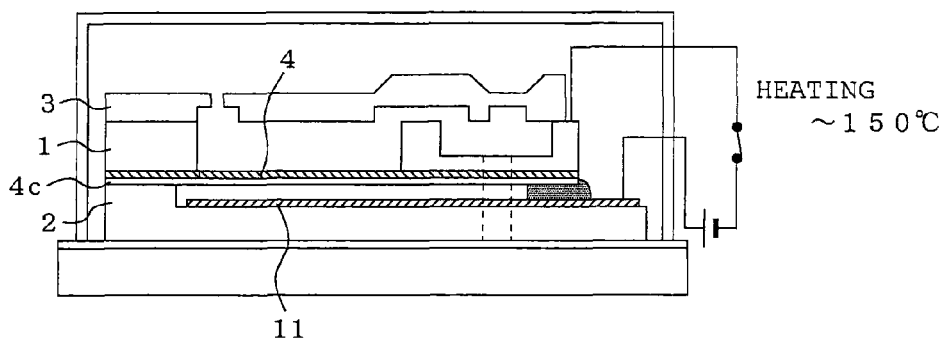
FIG. 23 is a diagram showing a manufacturing process of a droplet discharge head.
Figure 23:
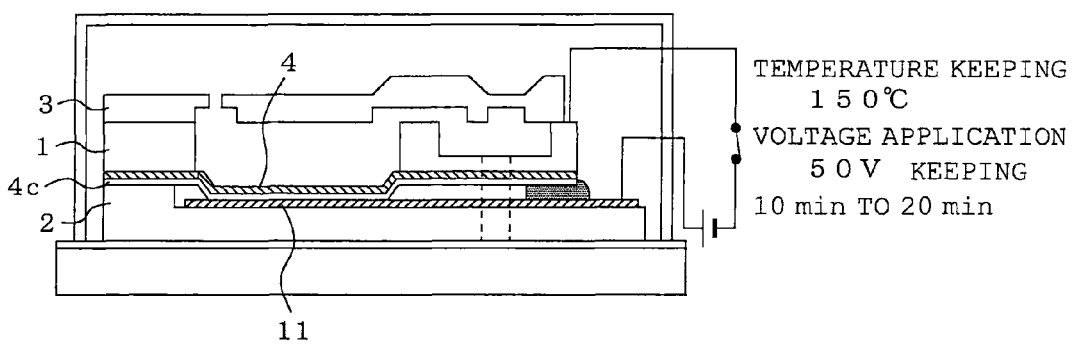
Figure 23:
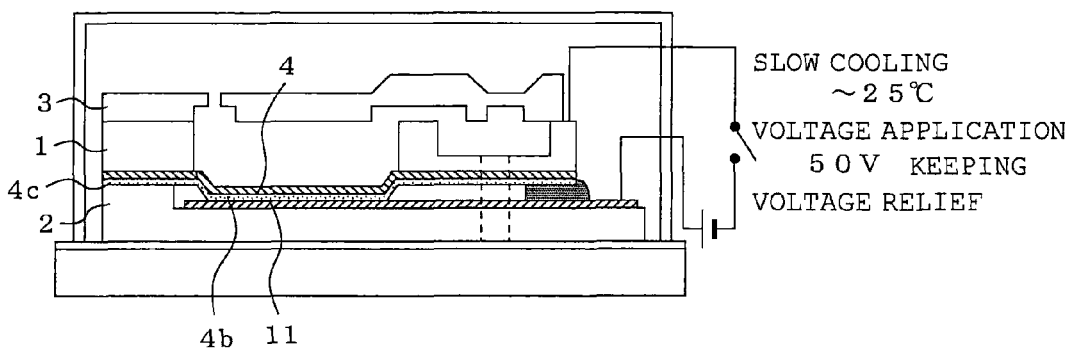

FIG. 23 is an explanatory diagram of the electret step for converting the insulating film to the electret.

As shown in FIG. 23(a), a joint substrate in the state in which a cavity plate 1, an electrode substrate 2, and a nozzle plate 3 are assembled by joining is placed on a hot plate 60 with a heat insulating material 61 therebetween, and the entire joint substrate is covered with a beaker 62 to keep the inside temperature. The entire droplet discharge head 100 in this state is heated by the hot plate 60 and kept at 150° C. (the heating step). The nozzle plate 3 may be joined, or may not be joined. When the nozzle plate 3 is joined, since a heating step (a heat treatment to cure an adhesive for joining the nozzle plate 3 (for example, at 60° C. to 150° C. for 2 hours)) is not performed in a later step, an electrostatic actuator can be manufactured stably.

As shown in FIG. 23(b), a voltage of 50 V is applied between the diaphragm 4 and the individual electrode 11, the diaphragm 4 is brought into the state of being in contact with the individual electrode 11, and this state is kept for 10 minutes to 20 minutes (the voltage application step). At this time, the temperature in the beaker 62 is kept at 150° C. The voltage to be applied is specified to be higher than or equal to the driving voltage of the electrostatic actuator because it is required that the diaphragm 4 is attracted to the individual electrode 11 side and is brought into contact, and the insulating film 4c is polarized. In the configuration of the droplet discharge head of the present embodiment, a maximum driving voltage is specified to be 45 V and, therefore, the voltage to be applied here is set at 50V. Subsequently, as shown in FIG. 23(c), the temperature in the beaker 62 is slowly lowered to room temperature (25° C.) while the voltage is kept at 50 V and, thereafter, the voltage is released (slow cooling step).

According to the above-described treatment, the state being polarized during the heating remains as permanent polarization in the insulating film 4c and, therefore, the droplet discharge head 100 including the electret portion 4d can be produced. Here, in the insulating film 4c disposed all over the lower surface of the cavity plate 1, a portion in contact with the individual electrode 11 in the step shown in FIG. 23(b) is primarily converted to the electret. This portion becomes the above-described electret portion 4d.

According to the above-described manufacturing method, in the formation of the electret portion 4d, since a heating treatment and a voltage application treatment are conducted simply, the production can be performed easily.

In each of the above-described embodiments, an example in which the electret portion 4d is configured by the insulating film 4c disposed on the surface of the diaphragm 4 facing the individual electrode 11 is explained with reference to the drawings. However, the electret portion 4d may be configured by the insulating film 4c disposed on the surface of the individual electrode 11 facing the diaphragm 4. In this case as well, the electret portion 4d can be formed as in the above-described manufacturing method.

In the present embodiment, the electret portion 4d is formed from the silicon oxide film. However, other films of silicon oxynitride, tantalum oxide, hafnium-nitride silicate, hafnium-oxynitride silicate, and the like may be used. It is essential only that the electret portion 4d is formed from an insulating film capable of being converted to the electret.

Seventh Embodiment

Figure 24:
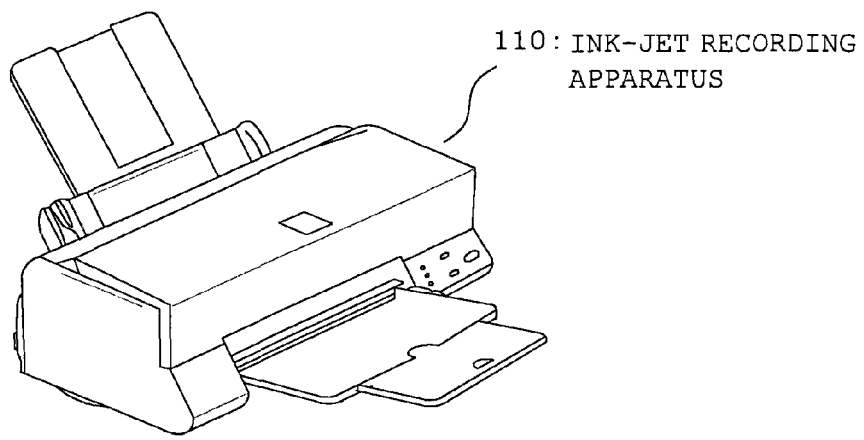
FIG. 24 is a diagram showing an example of a droplet discharge apparatus according to the seventh embodiment of the present invention.

FIG. 24 is a diagram showing an example of a droplet discharge apparatus according to the seventh embodiment of the present invention. In particular, an example of an ink-jet recording apparatus which discharges ink is shown in FIG. 24. An ink-jet recording apparatus 110 shown in FIG. 24 is an ink-jet printer, and any one of the droplet discharge heads 100, 100a, and 100b provided with the electrostatic actuators of the first, third, and fifth embodiments is incorporated. Consequently, a large diaphragm displacement can be attained in spite of the low voltage drive, and a generation pressure in the discharge chamber can be increased. As a result, stable discharge characteristics can be attained, and high resolution printing can be conducted. Therefore, according to the present seventh embodiment, the ink-jet recording apparatus 110 capable of performing stable high-quality printing can be produced.

The droplet discharge heads 100, 100a, and 100b provided with the electrostatic actuators of the first, third, and fifth embodiments can be applied to droplet discharge apparatuses for performing, for example, formation of matrix patterns of color filters, formation of light emitting portions of organic EL display devices, and discharge of living body liquid samples, in addition to the ink-jet printer shown in FIG. 24, by variously changing the liquid to be discharged.

Eighth Embodiment

Figure 25:
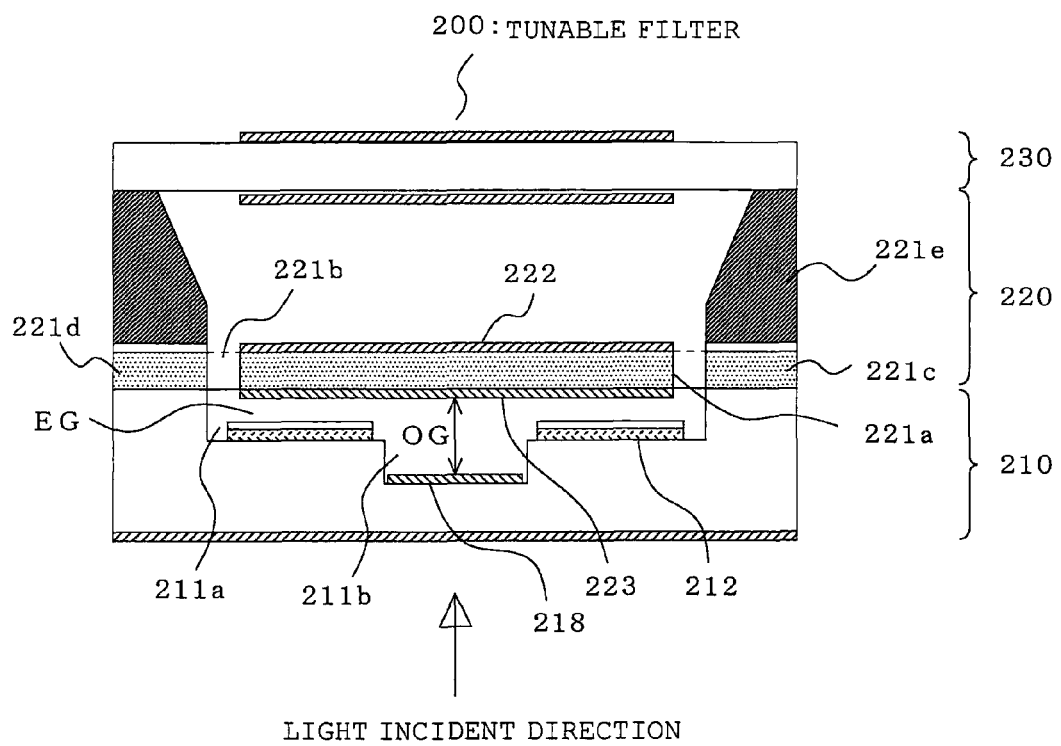
FIG. 25 is a diagram showing an example of a device according to the eighth embodiment.

The application of the electrostatic actuators according to the present invention is not limited to the droplet discharge heads 100, 100a, and 10b, and the electrostatic actuators can be applied to various devices. FIG. 25 is a diagram showing an example of a device according to the eighth embodiment of the present invention incorporating the electrostatic actuator according to the present invention. The device incorporating the electrostatic actuator, as shown in FIG. 25, is a tunable filter 200. This is provided with a driving electrode portion 210, a movable portion 220, and a package portion 230, and filtrates light with a specific wavelength from the incident light taking advantage of position change of the movable portion 220 so as to emit the resulting light.

In the movable portion 220, a movable body 221a, which includes a movable reflection surface 223 and which transmits light with a predetermined wavelength and reflects light with a wavelength other than the predetermined wavelength by moving in a direction perpendicular to the surface direction of the movable reflection surface 223, a coupling portion 221b and a support 221c, which support the movable body 221a movably, and a spacer 221e, which forms a space on the side opposite to the movable reflection surface 223, are disposed integrally. The movable body 221a is formed from, for example, a silicon active layer having a thickness of 1 μm to 10 μm.

The driving electrode portion 210 includes a driving electrode 212, which is disposed having an electrostatic gap EG relative to the movable body 221a and which constitutes another electrode opposed to the movable body 221a, and a fixed reflection surface 218 which is disposed having an optical gap OG relative to the movable reflection surface 223 and which further reflects light reflected by the movable reflection surface 223. The driving electrode portion 210 is joined to the movable portion 220 on the side opposite to the side provided with the spacer 221e, in such a way that the movable reflection surface 223 and the fixed reflection surface 218 face to each other. For example, a glass substrate can be used as a substrate of the driving electrode portion 210.

The package portion 230 is joined to the end of the spacer 221e in such a way as to block the space formed by the spacer 221e of the movable portion 220.

In the tunable filter 200 having the above-described configuration, the movable body 221a corresponds to the diaphragm 4 of the first, third, or fifth embodiment, the driving electrode 212 corresponds to the individual electrode 11 of the first, third, or fifth embodiment, and these constitute the electrostatic actuator. Therefore, a tunable filter 200 capable of being driven at a low voltage can be produced by disposing an insulating film corresponding to the insulating film 4c of the first embodiment on the surface of the driving electrode 212. Furthermore, the electrostatic force of the electrostatic actuator is improved, and the tunable filter 200 can be miniaturized.

As described above, the electrostatic actuators according to the present invention can be used as actuators of various devices, in particular micromachines. For example, the electrostatic actuators according to the present invention can be applied to pump portions of micropumps, switch driving portions of optical switches, mirror driving portions of mirror devices in which a plurality of microminiature mirrors are disposed and the direction of light is controlled by tilting the mirrors, and driving portions of laser operation mirrors of laser printers.

What is claimed is:

1. An electrostatic actuator by comprising:
   a diaphragm;
   an electrode facing the diaphragm and having a gap therebetween while a voltage is applied between the diaphragm and the electrode; and
   an insulating film disposed on a first surface of the diaphragm or on a second surface of the electrode, the first surface facing the electrode, the second surface facing the diaphragm,
   wherein the insulating film is converted to an electret,
   the diaphragm and the electrode are detachably in contact with each other with the insulating film therebetween by an attraction force generated by an electric field based on the electret at an initial condition with no voltage being applied, and
   the diaphragm is detached from the electrode when a voltage is applied between the diaphragm and the electrode to cancel the electric field based on the electret.

2. The electrostatic actuator according to claim 1, the gap disposed between the diaphragm and the electrode being sealed and the insulating film converted to the electret is disposed in the scaled gap.

3. The electrostatic actuator according to claim 1, the diaphragm comprising a boron-doped silicon substrate.

4. The electrostatic actuator according to claim 2, the diaphragm comprising a boron-doped silicon substrate.

5. The electrostatic actuator according to claim 1, the insulating film comprising a silicon oxide film converted to the electret.

6. The electrostatic actuator according to claim 2, the insulating film comprising a silicon oxide film converted to the electret.

7. The electrostatic actuator according to claim 3, the insulating film comprising a silicon oxide film converted to the electret.

8. A droplet, discharge head comprising
   a nozzle,
   a diaphragm constituting a bottom of a discharge chamber which communicates with the nozzle and which stores droplets to be discharged, and
   an electrode facing the diaphragm and having a gap therebetween while a voltage is applied between the diaphragm and the electrode,
   the nozzle being adapted to discharge a droplet in the discharge chamber by deformation of the diaphragm based on the electrostatic force generated by application of the voltage,
   wherein an insulating film converted to an electret is disposed on a first surface of the diaphragm or on a second surface of the electrode, the first surface facing the electrode, the second surface facing the diaphragm,
   the diaphragm and the electrode are detachably in contact with each other with the insulating film therebetween by an attraction force generated by an electric field based on the electret at an initial condition with no voltage being applied, and
   the diaphragm is detached from the electrode when a voltage is applied between the diaphragm and the electrode to cancel the electric field based on the electret, allowing the nozzle to discharge the droplet in the discharge chamber.

* * * * *